(12) United States Patent
MacAfee et al.

(10) Patent No.: US 11,323,214 B2
(45) Date of Patent: May 3, 2022

(54) AIRCRAFT CONTROL SYSTEM

(71) Applicant: Joby Aero, Inc., Santa Cruz, CA (US)

(72) Inventors: Scott MacAfee, Santa Cruz, CA (US); JoeBen Bevirt, Santa Cruz, CA (US); Jason Ryan, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 0 days.

(21) Appl. No.: 16/573,837

(22) Filed: Sep. 17, 2019

(65) Prior Publication Data
US 2020/0092052 A1 Mar. 19, 2020

Related U.S. Application Data

(60) Provisional application No. 62/732,374, filed on Sep. 17, 2018.

(51) Int. Cl.
| | |
|---|---|
| *H04L 1/22* | (2006.01) |
| *H04L 12/40* | (2006.01) |
| *H04Q 1/02* | (2006.01) |
| *H04L 12/10* | (2006.01) |

(52) U.S. Cl.
CPC ............... *H04L 1/22* (2013.01); *H04L 12/10* (2013.01); *H04L 12/40045* (2013.01); *H04Q 1/116* (2013.01); *H04L 2012/4028* (2013.01)

(58) Field of Classification Search
CPC ... H04L 1/22; H04L 12/40176; H04L 49/552; H04L 69/40
See application file for complete search history.

(56) References Cited

U.S. PATENT DOCUMENTS

| | | | |
|---|---|---|---|
| 1,386,713 A | 8/1921 | Leinweber et al. |
| 1,496,723 A | 6/1924 | Albert |
| 1,794,202 A | 2/1931 | Pickard |
| D171,509 S | 2/1954 | Lightborn et al. |
| 2,868,476 A | 1/1959 | Schlieben |
| 2,969,935 A | 1/1961 | Price |
| 2,981,339 A | 4/1961 | Kaplan |
| 3,002,712 A | 10/1961 | Beckwith |
| 3,035,789 A | 5/1962 | Young |
| 3,059,876 A | 10/1962 | Platt |
| 3,081,964 A | 3/1963 | Quenzler |
| 3,082,977 A | 3/1963 | Melvin |

(Continued)

FOREIGN PATENT DOCUMENTS

| | | |
|---|---|---|
| CN | 102239321 A | 11/2011 |
| CN | 102245878 A | 11/2011 |

(Continued)

OTHER PUBLICATIONS

Y.C. Yeh, Triple-Triple Redundant 777 Primary Flight Computer, 1996, IEEE, pp. 293-307 (Year: 1996).*

(Continued)

*Primary Examiner* — Ashley Shivers
(74) *Attorney, Agent, or Firm* — Schwegman Lundberg & Woessner, P.A.

(57) ABSTRACT

A fault-tolerant command and control system including a plurality of flight devices, a plurality of flight computers, a distribution network including a plurality of switches and cables connecting the plurality of flight devices to the plurality of flight computers, and a power source connected to the distribution network.

21 Claims, 8 Drawing Sheets

(56) References Cited

U.S. PATENT DOCUMENTS

| | | | |
|---|---|---|---|
| 3,089,666 A | 5/1963 | Quenzler |
| 3,136,499 A | 6/1964 | Kessler |
| 3,141,633 A | 7/1964 | Mackay |
| 3,159,361 A | 12/1964 | Weiland |
| 3,181,810 A | 5/1965 | Olson |
| 3,231,221 A | 1/1966 | Platt |
| 3,259,343 A | 7/1966 | Roppel |
| 3,350,035 A | 10/1967 | Schlieben |
| 3,360,217 A | 12/1967 | Trotter |
| 3,404,852 A | 10/1968 | Sambell et al. |
| 3,592,412 A | 7/1971 | Glatfelter |
| 3,618,875 A | 11/1971 | Kappus |
| 3,693,910 A | 9/1972 | Aldi |
| 3,795,372 A | 3/1974 | Feldman |
| 3,834,654 A | 9/1974 | Miranda |
| 3,856,238 A | 12/1974 | Malvestuto |
| 4,022,405 A | 5/1977 | Peterson |
| 4,047,840 A | 9/1977 | Ravenhall et al. |
| 4,053,125 A | 10/1977 | Ratony |
| 4,146,199 A | 3/1979 | Wenzel |
| 4,263,786 A | 4/1981 | Eng |
| 4,356,546 A | 10/1982 | Whiteside et al. |
| 4,387,866 A | 6/1983 | Eickmann |
| 4,459,083 A | 7/1984 | Bingham |
| 4,519,746 A | 5/1985 | Wainauski et al. |
| 4,569,633 A | 2/1986 | Flemming, Jr. |
| 4,667,909 A | 5/1987 | Curci |
| 4,742,760 A | 5/1988 | Horstman et al. |
| 4,784,351 A | 11/1988 | Eickmann |
| 4,799,629 A | 1/1989 | Mori |
| 4,914,657 A | 4/1990 | Walter et al. |
| 4,925,131 A | 5/1990 | Eickmann |
| 4,979,698 A | 12/1990 | Lederman |
| 4,982,914 A | 1/1991 | Eickmann |
| 5,001,646 A | 3/1991 | Caldwell et al. |
| 5,031,858 A | 7/1991 | Schellhase et al. |
| 5,082,079 A | 1/1992 | Lissaman et al. |
| 5,085,315 A | 2/1992 | Sambell |
| 5,141,176 A | 8/1992 | Kress et al. |
| 5,156,363 A | 10/1992 | Cizewski et al. |
| 5,174,721 A | 12/1992 | Brocklehurst |
| 5,184,304 A | 2/1993 | Huddle |
| 5,374,010 A | 12/1994 | Stone et al. |
| 5,381,985 A | 1/1995 | Wechsler et al. |
| 5,405,105 A | 4/1995 | Kress |
| 5,419,514 A | 5/1995 | Duncan |
| 5,472,156 A | 12/1995 | Bivens, III et al. |
| 5,515,282 A | 5/1996 | Jackson |
| 5,715,162 A | 2/1998 | Daigle |
| 5,806,805 A | 9/1998 | Elbert et al. |
| 5,823,468 A | 10/1998 | Bothe |
| 5,839,691 A | 11/1998 | Lariviere |
| 5,842,667 A | 12/1998 | Jones |
| 5,868,351 A | 2/1999 | Stamps et al. |
| 5,899,085 A | 5/1999 | Williams |
| 6,098,923 A | 8/2000 | Peters, Jr. |
| 6,254,032 B1 | 7/2001 | Bucher |
| 6,260,796 B1 | 7/2001 | Klingensmith |
| 6,276,633 B1 | 8/2001 | Balayn et al. |
| 6,286,783 B1 | 9/2001 | Kuenkler |
| 6,293,491 B1 | 9/2001 | Wobben |
| 6,343,127 B1 | 1/2002 | Billoud |
| 6,402,088 B1 | 6/2002 | Syrovy et al. |
| 6,460,810 B2 | 10/2002 | James |
| 6,474,604 B1 | 11/2002 | Carlow |
| 6,561,455 B2 | 5/2003 | Capanna |
| 6,625,033 B1 * | 9/2003 | Steinman ............ H05K 7/20581 |
| | | 174/382 |
| 6,655,631 B2 | 12/2003 | Austen-Brown |
| 6,719,244 B1 | 4/2004 | Gress |
| 6,745,977 B1 | 6/2004 | Long et al. |
| 6,883,748 B2 | 4/2005 | Yoeli |
| 6,892,980 B2 | 5/2005 | Kawai |
| 7,048,505 B2 | 5/2006 | Segota et al. |
| 7,118,066 B2 | 10/2006 | Allen |
| 7,147,182 B1 | 12/2006 | Flanigan |
| 7,159,817 B2 | 1/2007 | Vandermey et al. |
| 7,219,013 B1 | 5/2007 | Young et al. |
| 7,263,630 B2 | 8/2007 | Sailer |
| 7,310,573 B2 | 12/2007 | Stickling |
| 7,318,565 B2 | 1/2008 | Page |
| 7,364,114 B2 | 4/2008 | Wobben |
| 7,376,088 B2 | 5/2008 | Gambardella et al. |
| 7,802,754 B2 | 9/2010 | Karem |
| 7,822,516 B2 | 10/2010 | Yanaka et al. |
| 7,857,253 B2 | 12/2010 | Yoeli |
| 7,857,254 B2 | 12/2010 | Parks |
| 7,874,513 B1 | 1/2011 | Smith |
| 7,877,627 B1 | 1/2011 | Freydel |
| 7,950,606 B2 | 5/2011 | Atkey et al. |
| 8,016,226 B1 | 9/2011 | Wood |
| 8,016,566 B2 | 9/2011 | Agnihotri et al. |
| 8,056,866 B2 | 11/2011 | De |
| 8,152,096 B2 | 4/2012 | Smith |
| 8,275,494 B1 | 9/2012 | Roth |
| 8,376,264 B1 | 2/2013 | Hong et al. |
| 8,469,306 B2 | 6/2013 | Kuhn, Jr. |
| 8,485,464 B2 | 7/2013 | Kroo |
| 8,527,233 B2 | 9/2013 | McIntyre |
| 8,602,347 B2 | 12/2013 | Isaac et al. |
| 8,616,492 B2 | 12/2013 | Oliver |
| 8,708,273 B2 | 4/2014 | Oliver |
| 8,733,690 B2 | 5/2014 | Bevirt et al. |
| 8,800,912 B2 | 8/2014 | Oliver |
| 8,849,479 B2 | 9/2014 | Walter |
| 8,998,125 B2 | 4/2015 | Hollimon et al. |
| 9,046,109 B2 | 6/2015 | Duke et al. |
| 9,075,144 B1 | 7/2015 | Straub et al. |
| 9,102,401 B2 | 8/2015 | Collins et al. |
| 9,128,109 B1 | 9/2015 | Oneill |
| 9,316,141 B2 | 4/2016 | Pilavdzic |
| 9,415,870 B1 | 8/2016 | Beckman et al. |
| 9,422,055 B1 | 8/2016 | Beckman et al. |
| 9,435,661 B2 | 9/2016 | Brenner et al. |
| 9,527,581 B2 | 12/2016 | Bevirt et al. |
| 9,561,857 B2 | 2/2017 | Weber |
| 9,694,911 B2 | 7/2017 | Bevirt et al. |
| 9,771,157 B2 | 9/2017 | Gagne et al. |
| 9,786,961 B2 | 10/2017 | Dyer et al. |
| 9,851,723 B2 | 12/2017 | Builta |
| 9,855,819 B2 | 1/2018 | Ochocinski et al. |
| 9,944,386 B1 | 4/2018 | Reichert et al. |
| 9,963,228 B2 | 5/2018 | Mccullough et al. |
| 10,029,808 B2 | 7/2018 | Blanding et al. |
| 10,046,855 B2 | 8/2018 | Bevirt et al. |
| 10,144,503 B1 | 12/2018 | Vander Lind et al. |
| 10,144,504 B1 | 12/2018 | Selwa et al. |
| 10,183,746 B2 | 1/2019 | McCullough et al. |
| 10,208,676 B2 | 2/2019 | Johnson et al. |
| 10,246,184 B2 | 4/2019 | Ragland |
| 10,247,100 B2 | 4/2019 | Leamy et al. |
| 10,287,011 B2 | 5/2019 | Wolff et al. |
| 10,364,036 B2 | 7/2019 | Tighe et al. |
| 10,392,107 B2 | 8/2019 | Har et al. |
| 10,407,164 B2 | 9/2019 | Blumer |
| 10,497,996 B1 | 12/2019 | Muniz et al. |
| 10,501,194 B2 | 12/2019 | Knapp et al. |
| 10,513,334 B2 | 12/2019 | Groninga et al. |
| 10,780,786 B2 | 9/2020 | Del Core |
| 2002/0153452 A1 | 10/2002 | King et al. |
| 2003/0038213 A1 | 2/2003 | Yoeli |
| 2003/0062443 A1 | 4/2003 | Wagner et al. |
| 2003/0080242 A1 | 5/2003 | Kawai |
| 2003/0085319 A1 | 5/2003 | Wagner et al. |
| 2003/0094537 A1 | 5/2003 | Austen-Brown |
| 2003/0106959 A1 | 6/2003 | Fukuyama |
| 2004/0093130 A1 | 5/2004 | Osder et al. |
| 2004/0126241 A1 | 7/2004 | Zha et al. |
| 2004/0141170 A1 | 7/2004 | Jamieson et al. |
| 2004/0195460 A1 | 10/2004 | Sailer |
| 2004/0245376 A1 | 12/2004 | Muren |
| 2004/0261428 A1 | 12/2004 | Murry et al. |
| 2005/0178879 A1 | 8/2005 | Mao |
| 2005/0230524 A1 | 10/2005 | Ishiba |

(56) References Cited

U.S. PATENT DOCUMENTS

| | | |
|---|---|---|
| 2005/0251328 A1 | 11/2005 | Merwe et al. |
| 2006/0016930 A1 | 1/2006 | Pak |
| 2006/0097103 A1 | 5/2006 | Atmur |
| 2006/0113426 A1 | 6/2006 | Yoeli |
| 2006/0226281 A1 | 10/2006 | Walton |
| 2007/0036657 A1 | 2/2007 | Wobben |
| 2007/0154314 A1 | 7/2007 | Jarrah et al. |
| 2007/0170307 A1 | 7/2007 | De |
| 2007/0221779 A1 | 9/2007 | Ikeda |
| 2008/0048065 A1 | 2/2008 | Kuntz |
| 2008/0205416 A1 | 8/2008 | Dechiara |
| 2008/0283673 A1 | 11/2008 | Yoeli |
| 2009/0008499 A1 | 1/2009 | Shaw |
| 2009/0084907 A1 | 4/2009 | Yoeli |
| 2009/0140102 A1 | 6/2009 | Yoeli |
| 2009/0159757 A1 | 6/2009 | Yoeli |
| 2009/0200431 A1 | 8/2009 | Konings et al. |
| 2009/0224095 A1 | 9/2009 | Cox et al. |
| 2009/0283629 A1 | 11/2009 | Kroetsch et al. |
| 2010/0025006 A1 | 2/2010 | Zhou |
| 2010/0052978 A1 | 3/2010 | Tillotson |
| 2010/0072325 A1 | 3/2010 | Sambell |
| 2010/0076625 A1 | 3/2010 | Yoeli |
| 2010/0100260 A1* | 4/2010 | McIntyre .................. G01P 5/16 701/6 |
| 2010/0193644 A1 | 8/2010 | Karem |
| 2010/0264257 A1 | 10/2010 | Brunken |
| 2010/0270419 A1 | 10/2010 | Yoeli |
| 2010/0270435 A1 | 10/2010 | Karem |
| 2011/0001020 A1 | 1/2011 | Forgac |
| 2011/0024552 A1 | 2/2011 | Patt et al. |
| 2011/0042508 A1 | 2/2011 | Bevirt |
| 2011/0042509 A1 | 2/2011 | Bevirt et al. |
| 2011/0042510 A1 | 2/2011 | Bevirt et al. |
| 2011/0049306 A1 | 3/2011 | Yoeli |
| 2011/0049307 A1 | 3/2011 | Yoeli |
| 2011/0139923 A1 | 6/2011 | Papanikolopoulos et al. |
| 2011/0139939 A1 | 6/2011 | Martin et al. |
| 2011/0147533 A1 | 6/2011 | Goossen et al. |
| 2011/0180656 A1 | 7/2011 | Shue et al. |
| 2011/0284201 A1 | 11/2011 | Soenmez et al. |
| 2011/0303795 A1 | 12/2011 | Oliver |
| 2011/0315809 A1 | 12/2011 | Oliver |
| 2012/0025016 A1 | 2/2012 | Methven et al. |
| 2012/0061526 A1 | 3/2012 | Brunken |
| 2012/0091257 A1 | 4/2012 | Wolff et al. |
| 2012/0222441 A1 | 9/2012 | Sawada et al. |
| 2012/0234518 A1 | 9/2012 | Brodie et al. |
| 2012/0234968 A1 | 9/2012 | Smith |
| 2012/0251326 A1 | 10/2012 | Schimke et al. |
| 2013/0060406 A1 | 3/2013 | Christensen et al. |
| 2013/0132548 A1 | 5/2013 | Cabos |
| 2013/0138413 A1 | 5/2013 | Finch et al. |
| 2013/0164578 A1 | 6/2013 | Sweet et al. |
| 2013/0201316 A1* | 8/2013 | Binder .................. H04L 67/12 348/77 |
| 2013/0204544 A1 | 8/2013 | Thomas |
| 2014/0039735 A1 | 2/2014 | Major et al. |
| 2014/0046510 A1 | 2/2014 | Randolph et al. |
| 2014/0096501 A1 | 4/2014 | Pantalone et al. |
| 2014/0138492 A1 | 5/2014 | Van Staagen |
| 2014/0174707 A1 | 6/2014 | Lombardo et al. |
| 2014/0193683 A1 | 7/2014 | Mardall et al. |
| 2014/0230761 A1 | 8/2014 | Pilavdzic |
| 2014/0277869 A1 | 9/2014 | King et al. |
| 2014/0292260 A1 | 10/2014 | Dyer et al. |
| 2014/0299708 A1 | 10/2014 | Green et al. |
| 2014/0339372 A1 | 11/2014 | Dekel et al. |
| 2014/0358333 A1 | 12/2014 | White et al. |
| 2015/0012154 A1* | 1/2015 | Senkel .................. B64D 17/80 701/4 |
| 2015/0056058 A1 | 2/2015 | Grissom et al. |
| 2015/0102659 A1 | 4/2015 | Liffring et al. |
| 2015/0136897 A1 | 5/2015 | Seibel et al. |
| 2015/0147181 A1 | 5/2015 | Henze et al. |
| 2015/0232178 A1 | 8/2015 | Reiter |
| 2015/0266571 A1 | 9/2015 | Bevirt et al. |
| 2015/0274292 A1 | 10/2015 | Delorean |
| 2015/0274293 A1* | 10/2015 | Heusinger ............. B64C 39/024 701/36 |
| 2015/0360794 A1 | 12/2015 | Certain et al. |
| 2016/0026190 A1 | 1/2016 | Kowalski et al. |
| 2016/0031555 A1 | 2/2016 | Bevirt et al. |
| 2016/0031556 A1 | 2/2016 | Bevirt et al. |
| 2016/0083073 A1 | 3/2016 | Beckman |
| 2016/0107501 A1 | 4/2016 | Johnston |
| 2016/0109882 A1* | 4/2016 | Ouellette ............ B64C 13/0421 701/3 |
| 2016/0112151 A1* | 4/2016 | Chedas ................. H04J 3/0605 370/503 |
| 2016/0144957 A1 | 5/2016 | Claridge et al. |
| 2016/0167800 A1 | 6/2016 | Joubert et al. |
| 2016/0204488 A1 | 7/2016 | Arai et al. |
| 2016/0209290 A1 | 7/2016 | Shue |
| 2016/0214723 A1 | 7/2016 | Fox et al. |
| 2016/0236790 A1 | 8/2016 | Knapp et al. |
| 2016/0265556 A1 | 9/2016 | Stadler et al. |
| 2016/0272312 A1 | 9/2016 | Mallard |
| 2016/0294882 A1* | 10/2016 | Michaels ............ H04L 65/1013 |
| 2016/0304194 A1 | 10/2016 | Bevirt et al. |
| 2016/0304214 A1 | 10/2016 | Himmelmann et al. |
| 2016/0325841 A1 | 11/2016 | Beckman et al. |
| 2016/0342159 A1 | 11/2016 | Lanterna et al. |
| 2017/0036753 A1 | 2/2017 | Shue |
| 2017/0066531 A1 | 3/2017 | Mcadoo |
| 2017/0101176 A1 | 4/2017 | Alber et al. |
| 2017/0104385 A1 | 4/2017 | Salamon et al. |
| 2017/0131716 A1 | 5/2017 | Brekke et al. |
| 2017/0137132 A1 | 5/2017 | Wiegers et al. |
| 2017/0217584 A1 | 8/2017 | Elfeky et al. |
| 2017/0247126 A1 | 8/2017 | Blanding et al. |
| 2017/0267371 A1 | 9/2017 | Frolov et al. |
| 2017/0274983 A1 | 9/2017 | Beckman et al. |
| 2017/0277152 A1 | 9/2017 | Liu et al. |
| 2017/0297431 A1 | 10/2017 | Epstein et al. |
| 2017/0331323 A1 | 11/2017 | Ehrmantraut |
| 2018/0001994 A1 | 1/2018 | Morrison |
| 2018/0002016 A1 | 1/2018 | Mccullough et al. |
| 2018/0105279 A1 | 4/2018 | Tighe et al. |
| 2018/0115029 A1 | 4/2018 | Ren et al. |
| 2018/0134400 A1 | 5/2018 | Knapp et al. |
| 2018/0148182 A1 | 5/2018 | Fagundes et al. |
| 2018/0183657 A1* | 6/2018 | Beilin .................. H04L 43/10 |
| 2018/0215475 A1 | 8/2018 | Hurt et al. |
| 2018/0237148 A1 | 8/2018 | Hehn et al. |
| 2018/0239366 A1* | 8/2018 | Cutler ..................... G05D 1/08 |
| 2018/0244370 A1 | 8/2018 | Lombard |
| 2018/0251207 A1 | 9/2018 | Kim |
| 2018/0251226 A1 | 9/2018 | Fenny et al. |
| 2018/0287234 A1 | 10/2018 | Melack et al. |
| 2018/0290736 A1 | 10/2018 | Mikic et al. |
| 2018/0305030 A1 | 10/2018 | Galzin |
| 2018/0319491 A1 | 11/2018 | Kearney-Fischer |
| 2018/0354615 A1 | 12/2018 | Groninga et al. |
| 2018/0356439 A1 | 12/2018 | Luo et al. |
| 2018/0358664 A1 | 12/2018 | Zhang et al. |
| 2018/0362166 A1 | 12/2018 | Marr et al. |
| 2019/0004542 A1 | 1/2019 | Kim |
| 2019/0077219 A1 | 3/2019 | Frieling et al. |
| 2019/0097282 A1 | 3/2019 | Melack et al. |
| 2019/0144109 A1 | 5/2019 | Ewing et al. |
| 2019/0202310 A1 | 7/2019 | Gebhart |
| 2019/0210740 A1 | 7/2019 | Luo |
| 2019/0214161 A1 | 7/2019 | Chen et al. |
| 2019/0315471 A1 | 10/2019 | Moore et al. |
| 2019/0316849 A1 | 10/2019 | Mendez Abrego et al. |
| 2019/0341659 A1 | 11/2019 | Terwilliger |
| 2019/0351740 A1 | 11/2019 | Filipkowski et al. |
| 2020/0001995 A1 | 1/2020 | Fang et al. |
| 2020/0140094 A1 | 5/2020 | White |
| 2020/0142431 A1 | 5/2020 | Mehl et al. |
| 2020/0148347 A1 | 5/2020 | Bevirt et al. |
| 2020/0207477 A1 | 7/2020 | Ghesquiere et al. |
| 2020/0303789 A1 | 9/2020 | Macdonald et al. |

(56) References Cited

U.S. PATENT DOCUMENTS

| | | |
|---|---|---|
| 2020/0339010 A1 | 10/2020 | Mllanueva et al. |
| 2020/0350648 A1 | 11/2020 | Rheaume |
| 2020/0355121 A1 | 11/2020 | O'Meallie et al. |
| 2020/0376927 A1 | 12/2020 | Rajaie et al. |
| 2020/0385127 A1 | 12/2020 | Devault |
| 2020/0391876 A1 | 12/2020 | Morrison |

FOREIGN PATENT DOCUMENTS

| | | |
|---|---|---|
| CN | 102407944 A | 4/2012 |
| CN | 102245878 B | 11/2013 |
| CN | 102239321 B | 7/2014 |
| CN | 103363993 B | 4/2016 |
| CN | 107042884 A | 8/2017 |
| CN | 107709161 A | 2/2018 |
| CN | 108349585 A | 7/2018 |
| DE | 102012104783 | 12/2013 |
| EP | 0945841 A1 | 9/1999 |
| EP | 2423106 A2 | 2/2012 |
| EP | 3210885 A1 | 8/2017 |
| EP | 3315401 A1 | 5/2018 |
| EP | 3366583 A1 | 8/2018 |
| EP | 3401216 | 11/2018 |
| EP | 3499634 | 6/2019 |
| EP | 3565083 A1 | 11/2019 |
| GB | 1271102 | 4/1972 |
| JP | 2017154728 A | 9/2017 |
| WO | 03074924 | 9/2003 |
| WO | 03086857 | 10/2003 |
| WO | 2016034830 A1 | 3/2016 |
| WO | 2016189421 A1 | 12/2016 |
| WO | 2017009037 | 1/2017 |
| WO | 2017108634 | 6/2017 |
| WO | 2019001203 A1 | 1/2019 |
| WO | 2019056053 | 3/2019 |
| WO | 2020061085 | 3/2020 |

OTHER PUBLICATIONS

International Search Report and Written Opinion for PCT Application No. PCT/US2019/039247 dated Sep. 13, 2019.
International Search Report and Written Opinion for PCT Application No. PCT/US2019/035236 dated Aug. 20, 2019.
"Airfolds Blade Profile", Mecaflux Heliciel, Propeller & Wing, https://www.heliciel.com/en/aerodynamique-hydrodynamique/profils%20aile%20profil%20pale.htm.
"Inclined Flat Plate", Aerodynamics of the airplane, Feb. 13, 2016.
"International Search Report and Written Opinion of the ISA, dated Jul. 24, 2019, for application No. PCT/US19/31863."
Denham, Jr., James W., et al., "Converging on a Precision Hover Control Strategy for the F35B Stovl Aircraft", AIAA Guidance, Navigation and Control Conference and Exhibit Aug. 18-21, 2006, Honolulu, Hawaii, Abstract only.
Falco, Gianluca , et al., "Loose and Tight GNSS/INS Integrations: Comparison of Performance Assessed in Real Urban Scenarios", Sensors (Basel) Feb. 2017; 17 (2): 225, https://www.ncbi.nlm.nih.gov/pmc/articles/PMC5335985/.
Gold, Phillip J., et al., "Design and Pilot Evaluation of the RAH-66 Comanche Selectable Control Modes", https://itrs.nasa.gov/search.jsp?, N94-13322, pp. 419-431, Jul. 1, 1993.
Saraf, A. Amit Kumar , et al., "Study of Flow Separation on Airfoil with Bump", International Journal of Applied Engineering Research ISSN 09773-4562, vol. 13, No. 16 (2018), pp. 128686-12872.
"International Search Report and Written Opinion of the ISA dated Dec. 4, 2019 for PCT/US19/51565."
International Search Report and Written Opinion of the ISA dated Mar. 19, 2020 for PCT/US19/67618.
International Search Report and Written Opinion for application No. PCT/US20/29617 dated Jan. 12, 2021.
"International Application Serial No. PCT US2019 065301, International Search Report dated Aug. 31, 2020", 2 pgs.
"Ailerons", NASA student page, downloaded from: https: www.grc.nasa.gov www k-12 airplane alr.html, (Nov. 1, 2018), 4 pgs.
"International Application Serial No. PCT US2019 051565, International Preliminary Report on Patentability dated Mar. 25, 2021", 6 pgs.
"European Application Serial No. 15765064.9, Extended European Search Report dated Oct. 16, 2017", 10 pgs.
"International Application Serial No. PCT US2010 046500, International Search Report dated Apr. 13, 2011", 2 pgs.
"International Application Serial No. PCT US2010 046500, Written Opinion dated Apr. 13, 2011", 8 pgs.
"International Application Serial No. PCT US2015 021344, International Search Report dated Sep. 11, 2015", 4 pgs.
"International Application Serial No. PCT US2015 021344, Written Opinion dated Sep. 11, 2015", 7 pgs.
"International Application Serial No. PCT US2015 021350, International Search Report dated Sep. 15, 2015", 5 pgs.
"International Application Serial No. PCT US2015 021350, Written Opinion dated Sep. 15, 2015", 13 pgs.
"International Application Serial No. PCT US2017 059809, International Search Report dated Jul. 31, 2018", 2 pgs.
"International Application Serial No. PCT US2017 059809, Written Opinion dated Jul. 31, 2018", 5 pgs.
"Curtiss-Wright X-19", [Online]. Retrieved from the Internet: https: en.wikipedia.org wiki Curtiss-Wright_X-19, 4 pgs.
"International Application Serial No. PCT US2020 030143, International Search Report dated Dec. 8, 2020", 2 pgs.
"International Application Serial No. PCT US2020 030143, Written Opinion dated Dec. 8, 2020", 4 pgs.
"International Application Serial No. PCT US2020 052920, International Search Report dated Dec. 9, 2020", 2 pgs.
"International Application Serial No. PCT US2020 052920, Written Opinion dated Dec. 9, 2020", 5 pgs.
"International Application Serial No. PCT US2019 065293, International Search Report dated Feb. 11, 2020", 2 pgs.
"International Application Serial No. PCT US2019 065293, Written Opinion dated Feb. 11, 2020", 5 pgs.
"European Application Serial No. 19863480.0, Communication pursuant to Rules 161(2) and 162 EPC dated Apr. 28, 2021", 3 pgs.
Berger, Tom, "Handling Qualities Requirements and Control Design for High-Speed Rotorcraft", Special Report FCDD-AMV-20-01, Combat Capabilities Devcom Aviation and Missile Center, U.S. Army, (Feb. 2020), 360 pgs.
Carson, Biz, "First Look: Uber Unveils New Design For Uber Eats Delivery Drone", [Online], Retrieved from the Internet: https:www.forbes.com sites bizcarson 2019 10 28 first-look-uber-unveils-new-design-for -uber -eats-delivery-drone #1703f8d77812.
Dollinger, Daniel, "Control inceptor design for remote control of a transition UAV", AIAA Aviation Forum, Dallas, Texas, AIAA Aviation 2019 Forum, Paper 10.2514 6.2019-3268, (Jun. 17-21, 2019), 12 pgs.
Kim, Tae, "Reduction of Tonal Propeller Noise by Means of Uneven Blade Spacing", University of California, Irvine, Thesis, (2016).
Rabb, Stephan, "Proposal of a Unified Control Strategy for Vertical Take-off and Landing Transition Aircraft Configurations", AIAA Aviation Forum Atlanta, Georgia Applied Aerodynamics Conference, 22 pgs.
Radhakrishnan, Anand, "An experimental investigation of a quad tilt rotor in ground effect", 21st Applied Aerodynamics Conference, Orlando, Florida, AIAA Paper AIAA 2003-3517, (Jun. 23-26, 2003), 11 pgs.
Sullivan, Brenda M, "A Subject Test of Modulated Blade Spacing for Helicopter Main Rotors", Presented at the American Helicopter Society 58th Annual Forum, Montreal, Canada, (Jun. 11-13, 2002).
Thorsen, Adam T, "Development and Evaluation of a Unified Control Architecture for a Compound Rotorcraft in Maneuvering Flight", AIAA Aviation Forum, AIAA Atmospheric Flight Mechanics Conference, Washington, D.C., AIAA Paper 10.2514 6.2016-3392, (Jun. 13-17, 2016), 19 pgs.
Vigano, Luca, "Development of Augmented Control Laws for a Tiltrotor in Low and High Speed Flight Modes", 43rd European Rotorcraft Forum Proceedings, Milan, Italy, vol. 1, (Sep. 12-15, 2017), 438-451.

(56) References Cited

OTHER PUBLICATIONS

Walker, Gregory, "F-35B integrated flight-propulsion control development", AIAA Aviation Forum, 2013 International Powered Lift Conference Los Angeles, CA, AIA Paper 10.2514 6.2013-4243, (Aug. 12-14, 2013), 16 pgs.

Whittle, Richard, "Flying the Osprey is not dangerous, just different: Veteran pilots", Breaking Defense, downloaded from: https: breakingdefense .com 20 12 09 flying-the-osprey-is-not-dangerous-just-different-veteran-pilo , (Sep. 5, 2012), 9 pgs.

Young, Larry, "Conceptual Design Aspects of Three General Sub-Classes of Multi-Rotor Configurations Distributed, Modular, and Hetergenerous", NASA Ames Research Center, Moffett Field Computer Science, (2015).

Youngshin, Kang, "Development of flight control system and troubleshooting on flight test of a tilt-rotor unmanned aerial vehicle", International Journal of Aeronautical and Space Sciences (IJASS), vol. 17 No. 1, (2016), 120-131.

\* cited by examiner

AIRCRAFT CONTROL SYSTEM

CROSS-REFERENCE TO RELATED APPLICATIONS

This application claims the benefit of US Provisional Application No. 62/732,374, filed Sep. 17, 2018, which is incorporated in its entirety by this reference.

TECHNICAL FIELD

This invention relates generally to the aviation field, and more specifically to a new and useful command and control system and method in the aviation field.

BACKGROUND

Command and control systems are important to the operation of aircraft. However, as the number of electrically powered components that use and/or generate data increases, the addition of separate power and data transfer systems can increase aircraft weight, production costs, and operating costs. In addition, conventional command and control systems often rely on the determinism of the data to process the state of the aircraft, which can lead to system failure in situations where data is corrupted or where uncertainty is otherwise introduced into the system. Electromagnetic interference (EMI) can cause certain data transfer protocols to be corrupted, and can particularly harm command and control system operation in systems with inadequate redundancy. Optical data transfer methodologies employed to overcome EMI typically require a separate power transfer network, which adds weight, cost, and other disadvantages. Conventional power transfer systems can also suffer from various disadvantages, including the complete or partial loss of downstream power in daisy-chained power networks upon failure of an upstream component.

Thus, there is a need in the aviation field to create a new and useful command and control system/method. This invention provides such a new and useful system/method.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Overview

Figure 1:
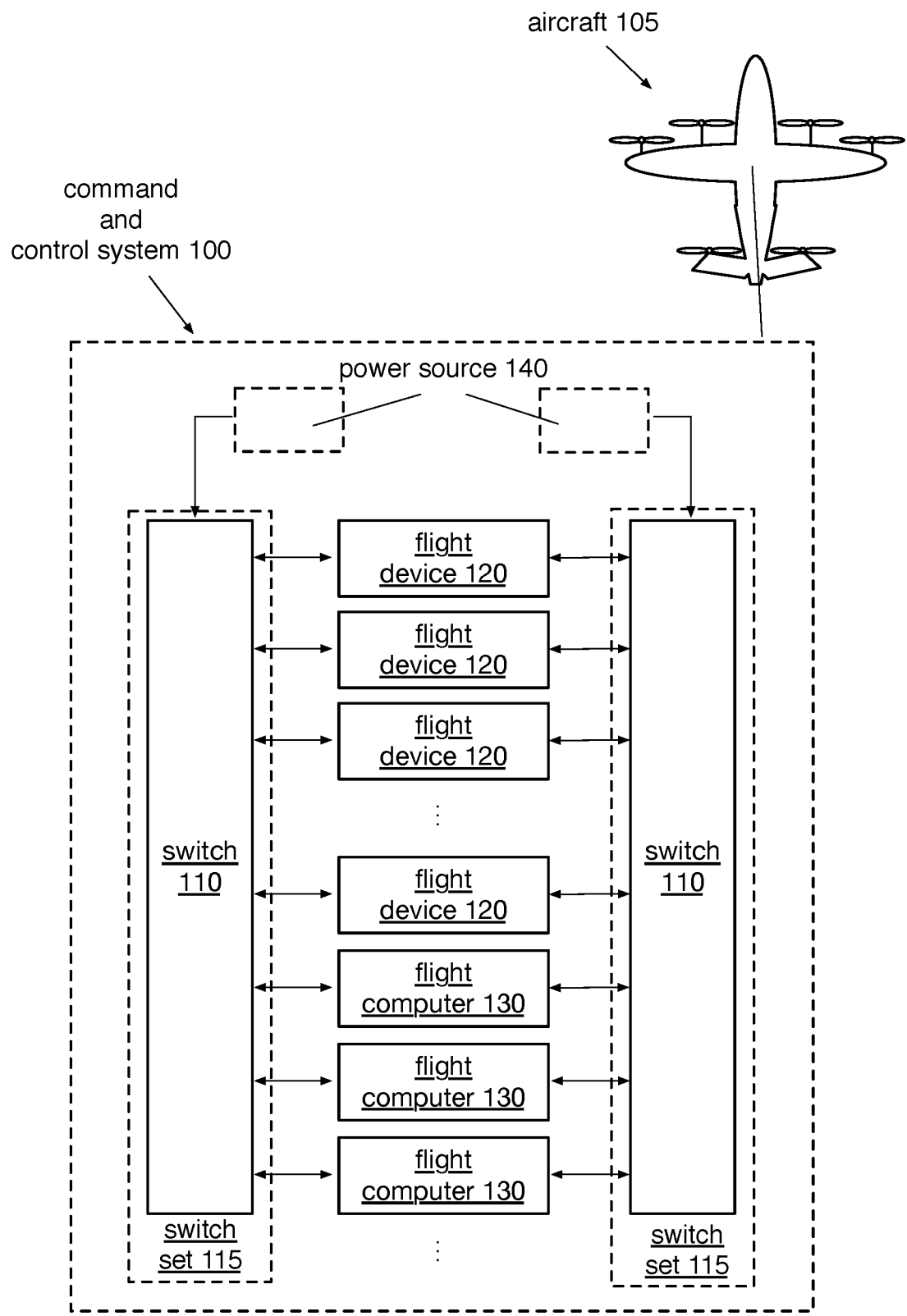
FIG. 1 is a diagram of a variation of the command and control system.

As shown in FIG. 1, the command and control system 100 includes a plurality of flight components, a distribution network connecting the plurality of flight components 120, and a power source 140 connected to the distribution network. The system 100 can additionally or alternatively include any other suitable components.

The system 100 functions to provide redundant and fault-tolerant power and data connections between flight components. Flight components may be flight computers 130 and/or flight devices 120, which can include flight-critical components (e.g., components providing core flight functionality to the aircraft 105) and non-flight-critical components (e.g., components providing functionality to non-flight-related portions of the aircraft and/or non-critical flight-related portions of the aircraft). Additionally or alternately, flight components may include one or more power sources 140 and/or any other appropriate components. The system 100 can also function to reduce and/or eliminate the number of single-point failure interfaces in an aircraft control system. The system 100 can also function to manage component failure (e.g., by isolating component and/or data failures) during aircraft operation to reduce and/or prevent failure propagation. The system can also function to provide duplicative (e.g., redundant, multiply redundant, etc.) power and/or data transmission to flight components and/or between flight components.

Power and data transfer between flight components (e.g., flight devices, flight computers) utilizing the distribution network can be performed according to various protocols and/or techniques. Preferably, the distribution network and flight components are configured according to a power-over-Ethernet (PoE) protocol and/or methodology. The PoE protocol can be standard (e.g., standardized according to an IEEE 802.3 standard, IEEE 802.3af-2003, IEEE 802.3at-2009, PoE+/PoE plus, 802.3bt, Alternative A, Alternative B, 4PPoE, a custom protocol, etc.), ad-hoc, or otherwise suitably configured. However, any other suitable shared power and data transmission protocol or cabling can be used (e.g., power-line communication, HomePlug AV, etc.). Power connections and data connections can be at least partially shared (e.g., power is transmitted over at least one wire on which data is also transmitted), and in some variations can be entirely overlapping (e.g., all wires used for transmitting data also transmit power) to minimize the number of connectors, cables, individual signal and/or power lines, and related components; alternatively, power and data connections can be made between components using different wires within a single cable (e.g., wherein the cable includes a plurality of wires and a first subset of the plurality are dedicated to data transmission and a second subset of the plurality are dedicated to power transmission). However, in further alternative variations, data and power connections can be entirely separate. The Ethernet variant utilized in the PoE configuration can be of any suitable type (e.g., 10 Mbit/s, 100 Mbit/s, Gigabit, etc.). Shared data and power connections may supply less than 20 Watts, more than 20 Watts, 12.95 Watts, between 20 Watts and 100 Watts, 25.50 Watts, 51 Watts, 71 Watts, or any other suitable amount of power. However, the system can otherwise suitably provide both data connections and/or electric power to flight components that produce and/or consume data, utilizing any suitable hardware and/or software standard or technique.

The term "rotor" as utilized herein, in relation to the control system or otherwise, can refer to a rotor, a propeller, and/or any other suitable rotary aerodynamic actuator. While a rotor can refer to a rotary aerodynamic actuator that makes use of an articulated or semi-rigid hub (e.g., wherein the connection of the blades to the hub can be articulated, flexible, rigid, and/or otherwise connected), and a propeller can refer to a rotary aerodynamic actuator that makes use of a rigid hub (e.g., wherein the connection of the blades to the hub can be articulated, flexible, rigid, and/or otherwise connected), no such distinction is explicit or implied when used herein, and the usage of "rotor" can refer to either configuration, and any other suitable configuration of articulated or rigid blades, and/or any other suitable configuration of blade connections to a central member or hub. Likewise, the usage of "propeller" can refer to either configuration, and any other suitable configuration of articulated or rigid blades, and/or any other suitable configuration of blade connections to a central member or hub. Accordingly, the tiltrotor aircraft can be referred to as a tilt-propeller aircraft, a tilt-prop aircraft, and/or otherwise suitably referred to or described.

The control system is preferably implemented in conjunction with an aircraft (e.g., the system can include an aircraft), but can additionally or alternatively be used with any other suitable vehicle (e.g., scooter, automobile, etc.). In particular, the aircraft is preferably a rotorcraft, but can additionally or alternatively include any suitable aircraft. The rotorcraft is preferably a tiltrotor aircraft with a plurality of aircraft propulsion systems (e.g., rotor assemblies, rotor systems, etc.), operable between a forward arrangement and a hover arrangement. However, the rotorcraft can alternatively be a fixed wing aircraft with one or more rotor assemblies or propulsion systems, a helicopter with one or more rotor assemblies (e.g., wherein at least one rotor assembly or aircraft propulsion system is oriented substantially axially to provide horizontal thrust), and/or any other suitable rotorcraft or vehicle propelled by rotors. The rotorcraft preferably includes an all-electric powertrain (e.g., battery powered electric motors) to drive the one or more rotor assemblies, but can additionally or alternatively include a hybrid powertrain (e.g., a gas-electric hybrid including an internal-combustion generator), an internal-combustion powertrain (e.g., including a gas-turbine engine, a turboprop engine, etc.), and any other suitable powertrain.

The aircraft (or vehicle) can be: automatically controlled (e.g., be an autonomous vehicle; controlled by the control system, etc.), manually controlled (e.g., piloted by a user), controlled by a hybridized control system (e.g., controlled by the control system, based on or in conjunction with user inputs), and/or otherwise controlled.

In a specific example of the control system, the system includes an electric tiltrotor aircraft including a plurality of tiltable rotor assemblies (e.g., six tiltable rotor assemblies). The electric tiltrotor aircraft can operate as a fixed wing aircraft, a rotary-wing aircraft, and in any liminal configuration between a fixed and rotary wing state (e.g., wherein one or more of the plurality of tiltable rotor assemblies is oriented in a partially rotated state). The control system of the electric tiltrotor aircraft in this example can function to command and control the plurality of tiltable rotor assemblies within and/or between the fixed wing arrangement and the rotary-wing arrangement.

2. Benefits

Variations of the system can afford several benefits and/or advantages.

First, variations of the system can mitigate, reduce, and/or eliminate aircraft reliance on determinism in a single source of flight data. For example, the system can utilize a switching rate (e.g., data update rate) faster than a shortest dynamic timescale associated with aircraft control (e.g., aerodynamic control), such that the impact of a singular data error (e.g., packet error, error in the output of a single data source, etc.) is minimized and/or otherwise reduced. Additionally or alternatively, variations of the control system can obtain a persistent (e.g., temporally persistent) description of the aircraft state (e.g., from data collected and/or generated by one or more flight data sources), such that a momentary and/or temporary signal loss or degradation (e.g., from a flight data source) does not have a substantial adverse impact on nominal aircraft operation (e.g., on operation of one or more flight data sinks, on aircraft control, etc.). Variations of the control system can additionally or alternatively utilize voting schemes (e.g., ranked voting schemes, unranked voting schemes, etc.) for determining which control input to use among a set of control inputs (e.g., received from multiple flight data sources).

Figure 2A:
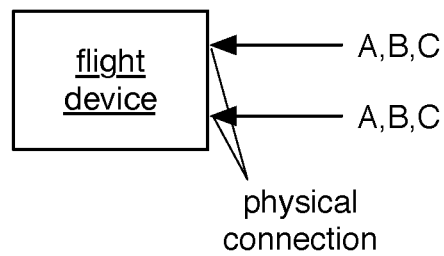
FIG. 2A is a diagram of an example flight component of the command and control system receiving duplicative flight data, according to a variation of the command and control system.

Second, variations of the system can reduce the quantity of data transfer connections without reducing the degree of data redundancy. For example, as shown in FIG. 2A, a component of the system receiving a triply redundant set of instructions (e.g., generated by three flight data sources, such as flight computers, generating data characterized by A, B, and C messages) over two direct data and/or power connections can achieve equal or greater redundancy versus the same component receiving a set of instructions from each of three flight data sources over a corresponding direct connection, while reducing the wiring mass and/or cost as compared to a triply redundant set of instructions received over three separate connections. In variants, the system can optionally leverage protocol-enabled voting at the switch (es) (e.g., PoE-protocol-enabled voting at a PoE switch), wherein a switch or switch set: receives the redundant control messages, selects the control message for system use (e.g., using a voting scheme enabled by the protocol), and transmits the selected control message to the downstream flight components. In these variants, the flight components can vote on a smaller set of inputs (e.g., the control messages selected by each switch or switch set, instead of the control messages output by each flight computer multiplied by the number of switches or switch sets), which can reduce the processing power consumed at the respective flight components. As such, variations of the system can reduce overall aircraft mass and increase aircraft safety.

Third, variations of the system can enable the use of less reliable flight components (e.g., flight devices, flight data sinks, flight data sources, etc.) by increasing the reliability of the data transmission network. Such variations can reduce overall aircraft cost by enabling the use of lower cost, less individually-reliable components (e.g., components having a lower design assurance level) without reducing overall system reliability. Such variations can also increase overall system reliability without increasing overall system cost by increasing the aggregate reliability of a system utilizing fixed cost components.

Figure 3:
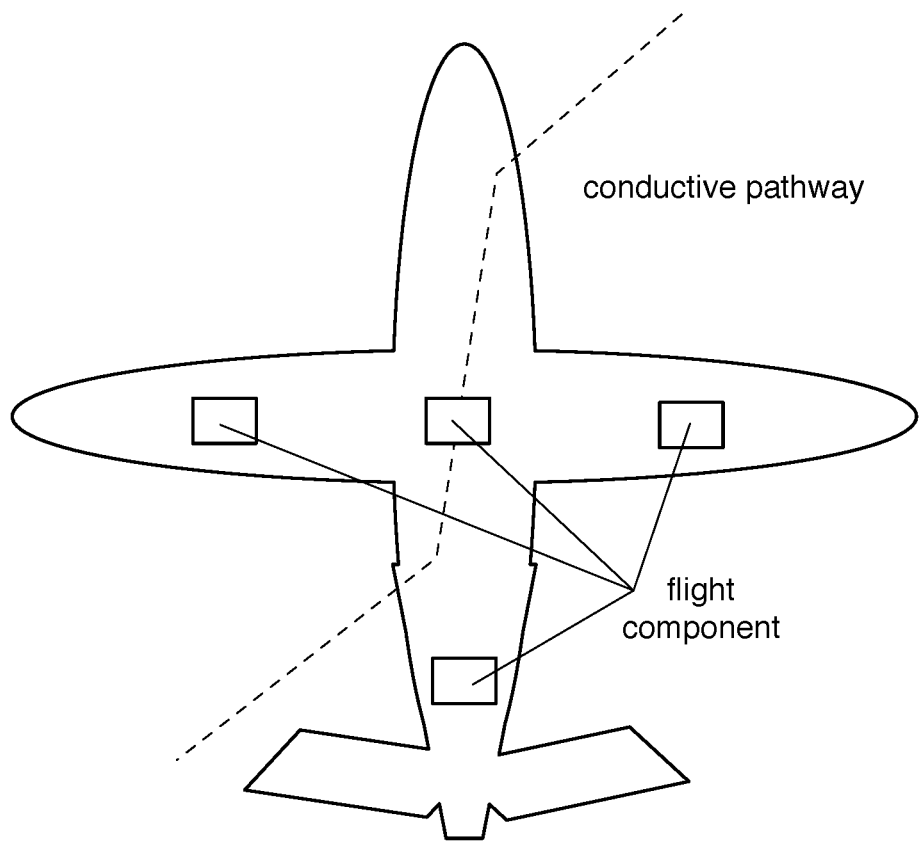
FIG. 3 is an example arrangement of flight computers of the command and control system relative to conductive pathways through an example aircraft utilizing an embodiment of the command and control system.

Fourth, variations of the system can make the aircraft robust to unplanned external damage sources (e.g., electrical or mechanical inputs). For example, as shown in FIG. 3, components of the system can be arranged such that flight-critical network hardware (e.g., flight computers, PoE switches, etc.) are distributed within the aircraft such that at least one instance of a flight-critical hardware component is outside the conductive pathway (e.g., arc path) through the aircraft and thereby resistant to system failure from lightning strikes or other damaging electrical atmospheric events (e.g., static charge buildup and spontaneous neutralization). In another example, components of the system can be arranged such that instances of flight-critical network hardware components are physically separated from one another (while connected via the distribution network) outside of a predetermined radius (e.g., predetermined based on a predicted, estimated, and/or historical damage radius resulting from explosive component failure, decompression, fire damage, etc.).

Fifth, variations of the system can prevent a marginal failure (e.g., failure in non-flight critical hardware, failure of fewer than the total number of redundant flight components for a particular purpose, etc.) from escalating into a serious failure (e.g., unknown aircraft state, loss of aircraft command and control ability, etc.) by maintaining a persistent state awareness of the aircraft (e.g., based on a plurality of redundant aircraft state information and associated failure status information).

Sixth, variations of the system can electrically, communicably, and/or physically isolate switch sets from each other. This can ensure truly redundant control message transmission, as the switch sets do not communicate with each other. This can also confer additional electrical protection by isolating excess current (e.g., from electrical overloading or short circuiting) to the originating switch set and/or forcing the excess current to flow through intermediate connections (e.g., the flight components and/or flight computers), which can function as circuit breakers or fuses and preclude excess current transmission to the remainder of the control system.

Seventh, variations of the system can directly communicably isolate the flight computers, such that the flight computers independently determine the control messages (e.g., based on a shared control system state or aircraft state, based on shared sensor information and fault information, etc.). This can reduce the number of control messages that are propagated and/or reinforced through the control system.

However, variations of the system can additionally or alternatively provide any other suitable benefits and/or advantages.

3. System

As shown in FIG. 1, the system 100 includes a plurality of flight components (e.g., flight devices, flight computers) that includes flight data sources and flight data sinks, a distribution network connecting the plurality of flight components, and a power source connected to the distribution network. The system 100 can additionally or alternatively include any other suitable components.

The flight components function to collect and/or utilize flight data as a flight data source and/or flight data sink, respectively. The flight components can also function to actuate aeromechanical components of the aircraft, determine the state of an actuator of the aircraft, receive control inputs (e.g., from a human pilot, from a control module, etc.) related to aircraft operation, and/or have any other suitable function related to aircraft flight and/or operation. The flight components can also function as networked devices (e.g., networked via the distribution network). The flight components are preferably powered flight components (e.g., requiring electrical power) and can function to consume electrical power in the performance of other functions; however, one or more flight components can be otherwise suitably powered. The flight components can additionally or alternatively have any other suitable function related to facilitating operation (e.g., flight, landing, take-off, etc.) of the aircraft.

The flight components can include one or more: mission displays, radios, flight computers, data loggers or acquisition devices, vehicle navigation systems (VNS), one or more cabin systems (e.g., powered devices within the cabin of the aircraft, powered devices that control environmental parameters of the cabin of the aircraft, etc.), avionics gateways, air data booms, battery management systems (BMS), heating, ventilation, and air-conditioning (HVAC) components, inceptors, inverters (e.g., a quad inverter, a standard inverter, etc.), battery management systems (BMS), flight devices (e.g., that control surfaces, such as ailerons, flaps, rudder fins, landing gear, etc.), sensors (e.g., kinematics sensors, such as IMUs; optical sensors, such as cameras; acoustic sensors, such as microphones and radar; temperature sensors; altimeters; pressure sensors; and/or any other suitable sensor), and any other suitable components related to aircraft flight. Flight components can additionally or alternately include: a sensor fusion module, a flight path vector module, data acquisition cards, a data acquisition logger, and an Ethernet radio module.

Various flight components can be considered flight-critical components. A flight-critical component is preferably a flight component for which nominal operation is especially desired during aircraft operation; however, any suitable flight component can be designated as a flight-critical component. The system can include any suitable number of any of flight-critical components, and any suitable flight components can be considered flight-critical components.

Various flight components can be considered non-flight-critical components. A non-flight-critical component is preferably a flight component for which nominal operation may be desired but is not critical for nominal aircraft operation (e.g., during flight); however, any suitable flight component can additionally or alternatively be designated as a non-flight-critical component.

The distinction between flight-critical components and non-flight-critical components can be static (e.g., determined based on the intrinsic characteristics of the flight component) or dynamic (e.g., determined based on the context of the flight component). For example, a flight component can be designated as a flight-critical component in system examples wherein the flight component is the only functional instance of its type (e.g., in scenarios wherein only a single instance is used in the system, in scenarios wherein duplicative instances of the flight component have failed or stopped operating within nominal ranges, etc.). In another example, a flight component can be non-critical irrespective of the context (e.g., wherein an off-the-shelf data logger for auxiliary data is non-critical in embodiments where the off-the-shelf data logger is the only instance of its component type incorporated into the system).

A flight component can operate as a flight data source. A flight data source functions to provide flight data to one or more components of the system (e.g., one or more flight data sinks) by way of the distribution network. In a system example including an aircraft that includes an air data boom, the air data boom can operate as a flight data source that provides flight data defining air pressure, temperature, and airflow direction relative to the aircraft (e.g., relative to the air data boom itself).

A flight component can operate as a flight data sink. A flight data sink functions to receive flight data from one or more components of the system (e.g., one or more flight data sources) by way of the distribution network. The flight data sink can also function to transform flight data for utilization by other flight components and provide the transformed flight data to other flight components (e.g., acting as a flight data source). Flight data preferably includes sensor measurements and component states, but can additionally or alternatively include commands (e.g., control messages; operation instructions; etc.) or any other suitable set of data. An example of a flight data sink includes the flight computers, which can receive measurements, state reports, fault logs, and/or any other suitable set of data from the flight data sources (e.g., remainder of the flight components). Flight components can operate as both a flight data source and flight data sink during system operation (e.g., consuming and utilizing flight data as well as transforming and/or providing flight data), but flight components can additionally or alternatively operate exclusively as a flight data source or flight data sink during system operation.

The plurality of flight components preferably includes one or more flight computers. The flight computer functions to transform flight data into commands that can be transmitted to and interpreted by controllable flight components (e.g., actuators, instruments, etc.). In variations including a plurality of flight computers, each of the plurality of flight computers can be a substantially identical instance of the same computer architecture and components, but can additionally or alternatively be instances of distinct computer architectures and components (e.g., generalized processors manufactured by different manufacturers). The flight computers can include: CPUs, GPUs, TPUs, ASICs, microprocessors, and/or any other suitable set of processing systems.

In variations, each of the flight computers performs substantially identical operations (e.g., processing of data, issuing of commands, etc.) in parallel, and is connected (e.g., via the distribution network) to the same set of flight components. In such variations, the output of each flight computer is provided to each flight component by way of the distribution network such that each flight component receives duplicative flight data generated by each of the flight computers. In one example, each flight computer can be redundantly connected to each component by multiple switch sets; however, each flight computer can be connected to each flight component (e.g., directly, indirectly) by a single switch set or otherwise connected to the flight components.

The flight computers may generate commands based on aircraft state information. The flight computers may receive, as inputs, information from the same or different switch sets. The flight computers preferably receive the same set of data (e.g., sensor measurements, device faults, etc.) from the same set of flight components (e.g., same sensors, same devices, etc.), but can additionally or alternatively receive different data, receive data from different flight components (e.g., wherein the flight components can be redundant across flight computers), and/or receive any other suitable set of data. The flight computers preferably receive data at substantially the same time (e.g., delayed by less than 1 ms, 10 ms, etc.), but can additionally or alternatively receive the data asynchronously (e.g., wherein the data is timestamped), or receive data at any other suitable time. The flight computers preferably generate commands at substantially the same time (e.g., in synchrony; wherein the flight computers are synchronized to a common clock, wherein the flight computers generate the commands at substantially the same processing rate or frequency, etc.), but can additionally or alternatively generate commands with any appropriate frequency, period, and/or event. Redundant commands generated by the flight computers may or may not be temporally offset (e.g., by 1-50 ms, fraction of command generation period, synchronous or asynchronous command generation, etc.).

Figure 8A:
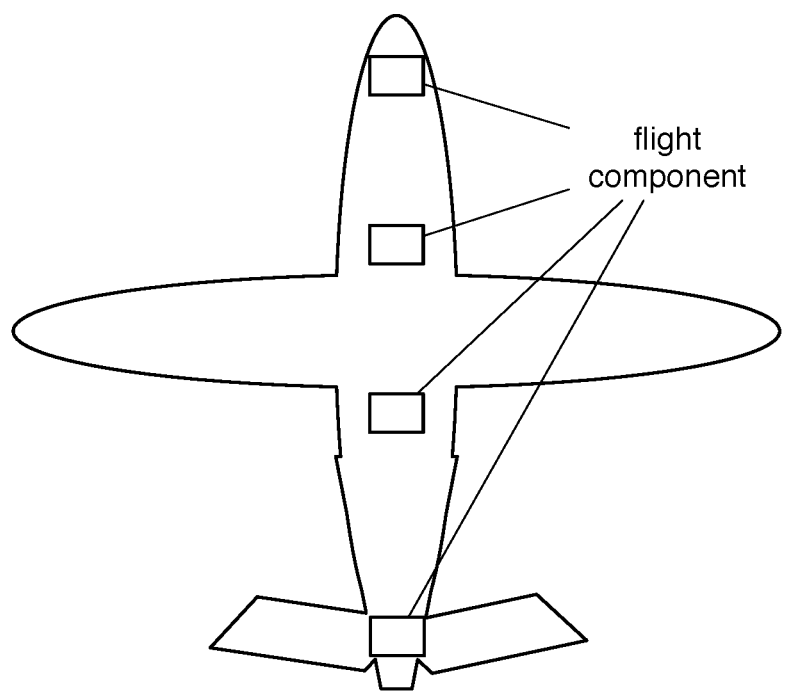
FIGS. 8A-8D are example arrangements of flight components in a first, second, third, and fourth embodiment of the command and control system, respectively.
Figure 8B:
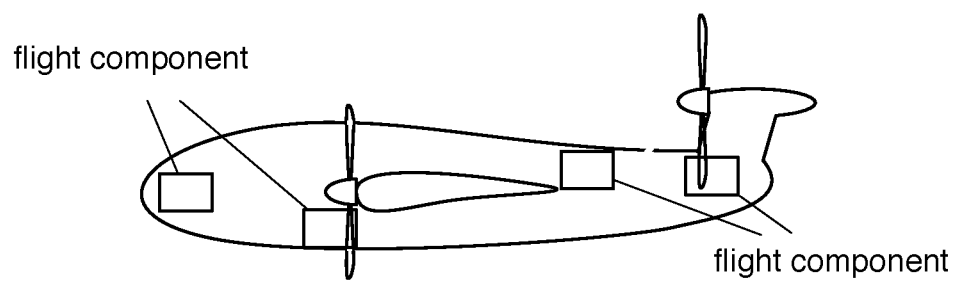
Figure 8C:
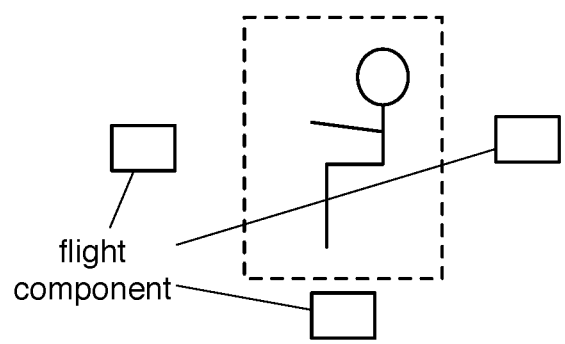
Figure 8D:
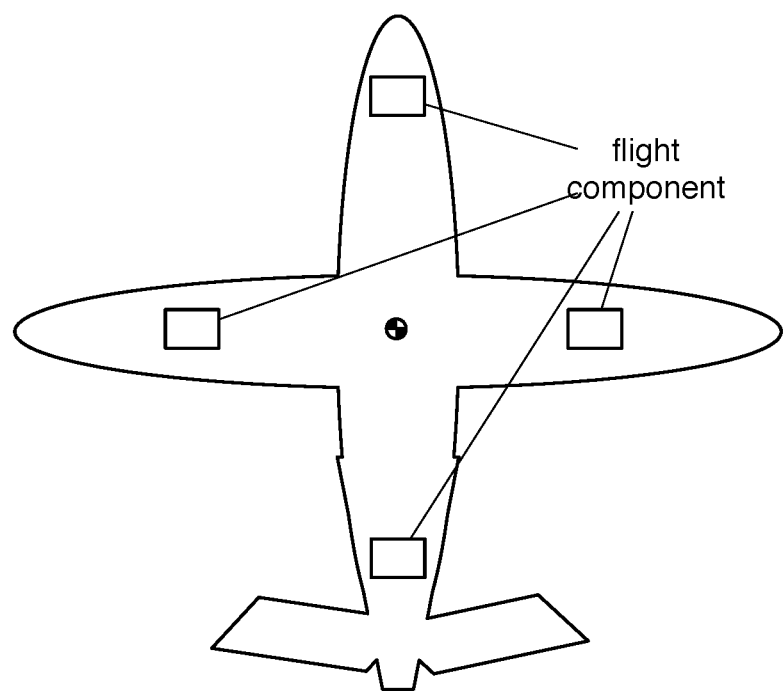

Flight computers can be distributed with any appropriate geometry or relationship. Flight computers may be distributed: linearly (e.g., parallel with or aligned along the pitch or roll axes as shown in FIG. 8A, additionally or alternately skewed or otherwise oriented, etc.); arranged in a single plane (e.g., above or below cabin, spanning the wing, along a plane defined by yaw and roll axes, or any arbitrary plane); distributed a predetermined distance away from aircraft components (e.g., offset by >1 m; offset by 2 m; offset by 5 m; a distance between 0.5 m-30 m; or any appropriate distance from: passengers, rotors, fuel tanks, batteries, landing gear, etc.); and/or distributed or collocated relative to switches, switch sets, or flight components (e.g., within 1 meter, 1-3 meters, adjacent to, within the same housing or electrical enclosure of: a switch, instance of a component such as a motor or motor inverter, group of flight components, a cluster of non-critical flight systems, the center of mass as shown in FIG. 8D, the center of pressure, etc.). The flight computers are preferably spaced apart by a minimum distance, wherein the minimum distance (e.g. 1 meter, 50 cm, >1 meter, any appropriate minimum distance) is determined based on an electrical arc path for the aircraft or conductive pathway (e.g., minimum distance from conductive pathway, opposite sides of conductive pathway, spaced apart by a distance relative to the distance of a flight computer to the conductive pathway, etc.), or impact survivability (e.g., determined by crash test, modeling or historic data relating to: fires and fire shielding, explosive components, decompression, lightning, charge neutralization, bird strike, user impacts, other sources of damage, etc.) such as in areas unlikely to be affected by same/similar source of damage (e.g., in front of cockpit, below passengers, behind luggage, rear of aircraft), and can additionally or alternately can be based on spatial constraints, user safety (as shown in FIG. 8C), accessibility, wiring length (e.g., determined relative to standard cable and/or wire lengths, etc.), or otherwise arranged. Additionally or alternatively, the flight computers can be arranged arbitrarily in 3 dimensions in any appropriate manner. In a first example illustrated in FIG. 8B, there is one flight computer located in front of the cockpit, one below the passengers, one behind the luggage compartment, and one in the tail of the aircraft. In a second example, there is at least one flight computer on opposite sides of a conducting pathway (or common ground).

In variations, the flight computers can be distributed within the aircraft to increase reliability and survivability of the command and control system. For example, a first flight computer can be arranged proximal a nose of the aircraft, a second flight computer can be arranged proximal a tail boom of the aircraft, and a third flight computer can be arranged proximal a center of mass of the aircraft and/or a wing of the aircraft. In related examples, the plurality of flight computers can be arranged to maximize the relative distance between the flight computers in relation to the aircraft. In further examples (e.g., as shown in FIG. 3), the plurality of flight computers can be arranged relative to conductive pathways between exterior surfaces of the aircraft such that at least one of the plurality of flight computers is distal (e.g., by a predetermined radius, not intersected by, etc.) each conductive pathway, which can prevent a lightning strike (or other exogenous electrical input to the aircraft) from damaging the entire plurality of flight computers. In variations of the command and control system, additional or alternative flight components can be likewise arranged and/or distributed within the aircraft to increase reliability and survivability of the command and control system.

The flight computers may be electrically isolated by a shield or electrical insulation. The flight computers can be electrically isolated from: other flight computers, flight components (e.g., devices, switches, power sources, etc.), the aircraft body or portions thereof (e.g., electrically conductive components, etc.), and/or any other suitable component. The shield or electrical insulation can include: a Faraday cage (e.g., mesh or enclosure made of conductive material grounded to an electrical ground, such as the aircraft frame), rubberized casings, spatial separation, and/or any other suitable material. In a first example, flight computers are isolated within an enclosure, which is preferably grounded to the aircraft frame (e.g., frame is composite material with integrated copper mesh acting as a Faraday cage) and/or an electrically conducting pathway. The flight computer may be fully or partially encapsulated, may be in the same or a different enclosure from one or more switches, may be in the same or a different enclosure from other flight computer(s), and/or may be electrically isolated in any appropriate manner. Most preferably, the flight computer is located by itself in a dedicated enclosure (e.g., Faraday cage style enclosure, composite with integrated copper mesh, etc.) containing no other switches, computers, or other component, but can additionally or alternately be electrically isolated relative to any appropriate devices/flight components. In a second example, flight computers are electrically isolated relative to a conducting pathway for the aircraft (e.g., with at least one flight computer on either side of the conducting pathway, at least one flight computer on either side of the conducting pathway from a top and/or side view).

The flight computers are preferably communicatively isolated from each other, but may alternately operate based on indirect or direct communication with other flight computers. In a first example, flight computers operate independently of one another, have no information about the data received or transmitted by other flight computers, and have no direct communication pathway to other flight computers. In a second example, flight computers have an indirect communication pathway to other flight computers (e.g., through one or more switches, through flight components or operation thereof). In a first variant, the indirect communication pathway transfers information between the flight computers. In a second variant, this indirect communication pathway transmits no information between the flight computers. In a third example, there is a cable directly connecting each at least two of the flight computers, and the flight computers cross-check commands (before, during, or after commands are transmitted to flight components).

The flight components acting as flight data sources, including the flight computers, preferably transmit fault status information in addition to other flight data related to component function. In turn, flight data sinks that utilize the flight data can determine the reliability of the incoming flight data (e.g., redundant flight data and/or instructions) and determine which flight data from among multiple substantially duplicative flight data sets to use (e.g., to execute the instructions or commands). For example, flight data sinks can implement a weighted voting scheme on redundant instruction sets accompanied by fault status information, to discount received flight data that is associated with low reliability and/or a fault status indicator indicating a failure of any suitable type, in favor of reliable data and/or data associated with a fault status indicator indicating no fault and/or the absence of a fault status indicator. However, flight components can otherwise suitably utilize redundant flight data to increase overall system reliability.

The distribution network functions to transfer electrical power and/or flight data between flight components of the system for command and control. The distribution network can include switches (power and/or data switches), and cables (e.g., power and/or data cables; bundles of electrically conductive physical connections).

The physical configuration of the distribution network is preferably substantially identical for power distribution and data distribution, with respect to each flight component, for a given power and data stream (e.g., the electrical power and flight data required for nominal flight component operation). Thus, in variations wherein a flight component requires both electrical power and flight data, the required electrical power and flight data are preferably provided to the flight component by at least one power and data switch over a single cable (e.g., associated with the required electrical power and flight data). In variations wherein a flight component requires only one of electrical power and flight data, either electrical power or flight data is preferably provided to the flight component over a single cable from a power and data switch, a power switch, and/or a data switch, respectively. However, the distribution network can have different configurations for power and data, or be otherwise configured.

The distribution network may include a physical connection between the power source(s) and each flight component. The physical connection functions to transmit the electrical power from the power source(s) to each flight component requiring electrical power. The physical connection is preferably directly between at least one battery of the power source(s) and a power switch (e.g., a power and data switch, a PoE switch, etc.) and directly between the power switch and each respective flight component, such that the power switch mediates the power provision to each flight component. The physical connection between a battery and a switch is preferably a direct conductive connection (e.g., a wired connection), and can be of any suitable type (e.g., high voltage transmission line, high power transmission cabling, etc.), and the connection between the switch and each flight component is preferably in an Ethernet-compatible form factor (e.g., a category 5 cable, category 3 cable, etc.); however, the physical connections for power transmission can be of any other suitable form factor.

The distribution network includes physical connections (e.g., power and/or data ports) between flight data sources and flight data sinks, by way of the one or more switches. The physical connection functions to transmit flight data in the form of electrical signals. As described above, the physical connections for data are preferably coextensive with the physical connections for power for physical links between the switch(es) and flight components, and data transmission is can be performed via the same cables of the distribution network (e.g., category 5 cable, category 3 cable, etc.). The form factor of each connection can be identical for each flight component, or different for specific flight components (e.g., category 5 or better for high power components, category 3 for low power components, any compatible cable form factor for flight component requiring only data transmission without power, etc.).

Each flight component preferably includes the same number of physical connections as switch sets in the distribution network (e.g., independent switch sets), wherein each physical connection is independently connected to a different switch set, but can additionally or alternatively include more or less physical connections (e.g., wherein the flight component is connected to a subset of the switch sets in the distribution network in the latter case). The physical connections (e.g., ports, cables) for a given flight component can be the same or different. The physical connections for different flight components can be the same or different. The physical connections preferably transmit redundant (e.g., the same) data between the flight component and the distribution network, but can additionally or alternatively transmit different data.

For example, each flight component is preferably connected to the distribution network by at least two physical connections (e.g., corresponding to different switch sets), and each of the two physical connections preferably transmits duplicate flight data and/or electrical power (e.g., wherein the loss of one of the two physical connections would enable the flight component to remain powered and/or suitably communicative with other components of the flight control system). The two physical connections are preferably made via separate cables (e.g., category 5 cables), but in alternative variations the two distinct, duplicative connections can be made via different sets of wires within the same cable. In still further variations, each flight component can be connected to the distribution network by any suitable number of physical connections.

The routing of redundant physical connections (e.g., the two physical connections as described above) between the one or more switches and associated flight components is preferably different for each physical connection (e.g., cable). Different cable routes for each connection can function to increase reliability and/or survivability of the connection, in the event that one of the connections is damaged, interfered with, or otherwise disturbed based on its position within the aircraft. The cable routes can vary in: physical arrangement on the aircraft, or cable type (e.g., cable class, rating, etc.), or otherwise vary. Redundant cabling (e.g., between the same two components, between a flight component and redundant switch sets, etc.) preferably has the same length or comparable data transmission speeds (given the respective cable length), but can additionally or alternatively have different lengths. However, in alternative variations, the redundant physical connections can be similarly or substantially identically routed between the switch(es) and the flight components.

In variants, the distribution network can include one or more cables that communicably, electrically, and/or physically connect flight components (e.g., flight devices, flight computers, power sources, etc.) together (e.g., as discussed above). The cables are preferably network cables (e.g., local area network cables), more preferably power and data cables (e.g., PoE cables, optical fiber, coaxial cable, serial cable, USB, a bus, etc.), but can additionally or alternatively be a set of power cables, data cables, and/or any other suitable cable. In examples, the cabling can include twisted pair Ethernet cabling, custom cabling, and/or any other suitable set of cabling. The cabling used to connect different component sets can be the same or different. Each cable preferably connects a pair of components, but can additionally or alternatively connect three or more components together.

The distribution network can include a plurality of switches 110. The switches function as gateways for directly-connected flight components (e.g., flight computers, devices, power sources, etc.) into the network, and can optionally: selectively route data, control power provision, and/or perform any other suitable functionality. Each of the plurality of switches is preferably a power and data switch, and more preferably a PoE switch (e.g., a switch configured to provide data transfer according to an Ethernet protocol and configured to provide power-over-Ethernet) that can function as a piece of power sourcing equipment (PSE) in accordance with a PoE standard as described above; however, the switches can additionally or alternatively be any other suitable network data switch, which may or may not be configured to additionally source power to connected devices in variations. Each of the plurality of switches can also function to transfer flight data (e.g., raw flight data, transformed flight data, etc.) between connected flight components.

The switches may communicate data (e.g., commands) from the flight computers to flight components (e.g., sinks, flight devices, etc.), may transfer power from the power source(s) (e.g., battery) to flight components (flight computers and flight devices) (e.g., via PoE, over the data cables, over the spare pairs, etc.), and may communicate data (e.g., aircraft state information) from flight components to flight computers. The data can be transferred using: transmission, broadcast, unicast, multicast, or any appropriate data transmission. Data may be commands, aircraft state information, and/or any other appropriate data. Aircraft state information may include faults (fault indicator, fault status, fault status information, etc.); sensor readings or information collected by flight components such as speed, altitude, pressure, GPS information, acceleration, user control inputs (e.g., from a pilot or operator), measured motor RPM, radar, images, or other sensor data; component status (e.g., motor controller outputs, sensor status, on/off, etc.); and/or any other appropriate information. Commands may include faults (fault indicator, fault status, fault status information, etc.); control commands (e.g., commanding rotor RPM (or other related parameter such as torque, power, thrust, lift, etc.), data to be stored, commanding a wireless transmission, commanding display output, etc.); and/or any other appropriate information.

Switches within the plurality of switches may be arranged in series, in parallel, or grouped into switch sets (which may, themselves, be in series or in parallel), or connected in any appropriate manner.

Switches may be grouped into one or more switch sets 115 (e.g., 2 sets, 4 sets, any appropriate number of sets). A switch set functions to redundantly communicate the same information between the same flight components connected to the respective switch set, but can additionally or alternatively provide power to the flight components connected to the respective switch set, or perform any other suitable functionality.

Figure 6A:
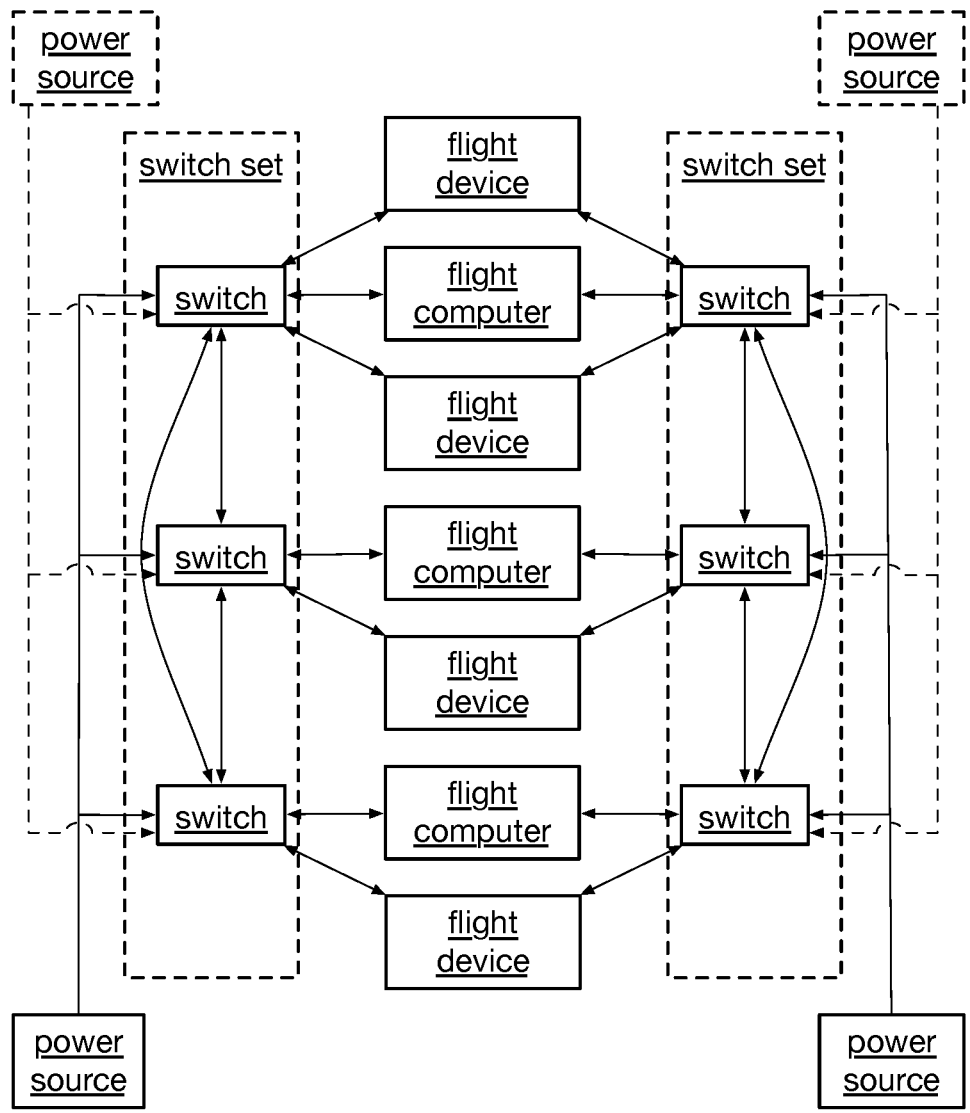
FIGS. 6A and 6B are a schematic diagrams of a first and second specific example of the command and control system, respectively.
Figure 6B:
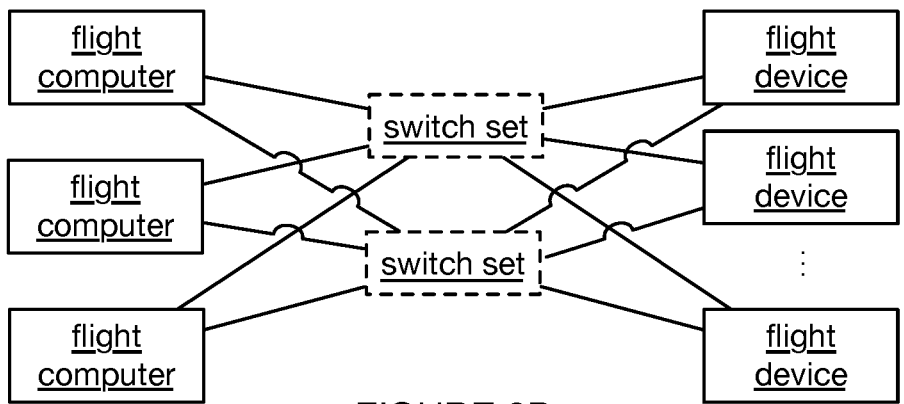

A switch set may include one or more switches (e.g., 4). Preferably, a switch set includes three or more switches (as shown in FIGS. 6A and 6B), but can additionally or alternately include one switch, two switches, or any appropriate number of switches. Each switch in the set is preferably electrically and/or communicably connected to all other switches in the set (e.g., switches in the set are interconnected, are fully connected, etc.), but additionally or alternately may be connected to a subset of the other switches within the switch set, to one or more than one other switch in the set (e.g., 2 switches, 3 switches, more than 3 switches, etc.). Switches may additionally or alternately be connected in a loop (which may have subloops or branching linear paths/loops) or a linear path (end nodes only connect to one node) which may have branching loops/paths), or in any appropriate manner. Connections between switches can be a cable (e.g., wire, set of wires, bundle of wires/cable such as an Ethernet cable) or multiple cables.

Preferably, switch sets are communicatively isolated, but the switch sets can additionally or alternately communicate in any appropriate manner. In a specific example, switch sets provide parallel communication channels between flight components, accept the same inputs, and return the same outputs. The switch sets can operate with any appropriate timing, communication frequency (continuous, periodic, event driven, etc.), with any appropriate relationship to data and/or other switches (e.g., synchronously, asynchronously), or in any appropriate manner. In a first variant, the switch sets can be indirectly communicatively connected (e.g. via an intermediate flight component/switch) with no communication pathway crossing the common node(s). In a second variant, switches in the first set do not directly communicate with switches in the second set (this may include: no knowledge of faults in the other switch set(s), no direct exchange of data between the switch sets, no direct exchange of power between the switch sets, and/or any appropriate implementation. In a third variant, there is no cable directly connecting switch sets. Additionally or alternately, switch sets may be communicatively isolated in any appropriate manner.

The switch sets are preferably electrically isolated, but can additionally or alternatively be electrically connected. Different switch sets are preferably electrically connected to different power sources, but can additionally or alternatively be connected to the same power source.

Switches within a switch set can be the same or different. Switches within a switch set can be distributed with any appropriate geometry or relationship. Switches may be distributed: linearly (e.g., parallel with or aligned along the pitch or roll axes, additionally or alternately skewed or otherwise oriented, etc.); arranged in a single plane (e.g., above or below cabin, spanning the wing, plane defined by yaw and roll axes, or any arbitrary plane); distributed a predetermined distance away from aircraft components (e.g., offset by >1 m; offset by 2 m; offset by 5 m; a distance between 0.5 m-30 m; or any appropriate distance from: passengers, rotors, fuel tanks, batteries, landing gear, etc.); distributed relative to computers or flight components (e.g., positioned: within 1 meter, 1-3 meters, adjacent to, within the same housing/enclosure, etc.) near a flight computer, instance of a component (e.g., motor/inverter), group of components (e.g., cluster of non-critical flight systems), relative to the CG, etc.); spaced apart by minimum radius (switches within a switch set spaced apart, switch spaced apart from another switch set, etc.), wherein minimum radius (e.g. 1 meter, 50 cm, >1 meter, any appropriate minimum radius) is related to electrical arc path, conductive pathway, or impact survivability (e.g., determined by crash test, modeling or historic data relating to: fires (and fire shielding), explosive components, decompression, lightning, charge neutralization, bird strike, user impacts, other sources of damage, etc.) such as in areas unlikely to be affected by same/similar source of damage (e.g. in front of cockpit, below passengers, behind luggage, rear of aircraft) and additionally or alternately can be based on spatial constraints, user safety, accessibility, wiring length, determined relative to standard cable and/or wire lengths, or otherwise arranged; or arranged arbitrarily in 3 dimensions in any appropriate manner.

Preferably, there is a direct connection between a switch set and each flight component, but additionally or alternatively a switch set can be connected to a subset of flight components, connected to flight components indirectly (e.g., flight components are wired to each other, communication and/or power passes through one or more flight components), or connected in any appropriate manner.

A different switch within each switch set is preferably connected to (e.g., directly connected to, acts as a gateway for) a different flight computer of the system. In this specific variant, if one switch within a switch set is inoperable, only one computer generated command is affected. However, a given switch within a switch set can be connected to (e.g., directly connected to) multiple flight computers, or otherwise connected to the flight computers.

A different switch within each switch set is preferably connected to (e.g., directly connected to, acts as a gateway for) a different flight component of the system. In this specific variant, if one switch within a switch set is inoperable, only one flight component is affected. However, a given switch within a switch set can be connected to (e.g., directly connected to) multiple flight components, or otherwise connected to the flight computers.

A different switch within each switch set is preferably connected to (e.g., directly connected to, acts as an ingress point for) a different power source of the system. In this specific variant, if one switch within a switch set is inoperable, only one power source is cut off from the rest of the system. However, a given switch within a switch set can be connected to (e.g., directly connected to) multiple power sources (e.g., power sources shared between switch sets), or otherwise connected to the power source(s) of the system.

The switches may be electrically isolated (e.g., from each other, from the other switch set, from other flight components, from flight computers, from the aircraft, etc.). In a first example, switches are isolated within an enclosure, which is preferably grounded to the aircraft frame (e.g., frame is composite material with integrated copper mesh acting as a Faraday cage) and/or an electrically conducting pathway. The switch may be fully or partially encapsulated, may be in the same or a different enclosure from other switches (e.g., those in the same switch set, from switches in different a switch set from switches connected to same/similar flight components, etc.), may be in the same or a different enclosure from flight computer(s) to which it is communicatively coupled, and/or may be electrically isolated in any appropriate manner. Most preferably, the switch is located by itself in a dedicated enclosure (e.g., Faraday cage style enclosure, composite with integrated copper mesh, etc.) containing no other switches, computers, or other component, but can additionally or alternately be isolated relative to any appropriate components.

The system may include an auxiliary switch or auxiliary switch set which may communicate with one or more switch sets (e.g., first and/or second switch sets), and which may have non-critical flight components as flight devices (e.g., sensor fusion, FPV, NI DAQ, DAQ Logger, Ethernet radio, etc.).

The switches can be configured to provide power (e.g., power-over-Ethernet) at various electrical power levels (e.g., to various components of differing power requirements) and data at various data rates (e.g., to various components of differing data rate and/or bandwidth requirements). For example, a switch can be configured to provide gigabit Ethernet, gigabit 13 W PoE, 10 Mbit 13 W PoE, 100 Mbit 13 W PoE, gigabit 71 W PoE, and/or any other suitable combination of data rate and power level, from any suitable connection port of the switch.

In a specific example, the distribution network includes three switches, wherein two of the three switches are PoE switches connected to a first subset of flight components and the third switch is connected to a second subset of flight components, wherein the subsets are non-overlapping. The first subset of flight components in this example are flight-critical components (e.g., as described above), and the second subset of flight components are non-flight-critical components (e.g., as described above). However, in related examples, the distribution network can include any suitable number of switches, connected to the set of flight components in any suitable network configuration (e.g., entirely overlapping redundant connections, entirely distinct sets of connections, partially overlapping connections, etc.).

Figure 5:
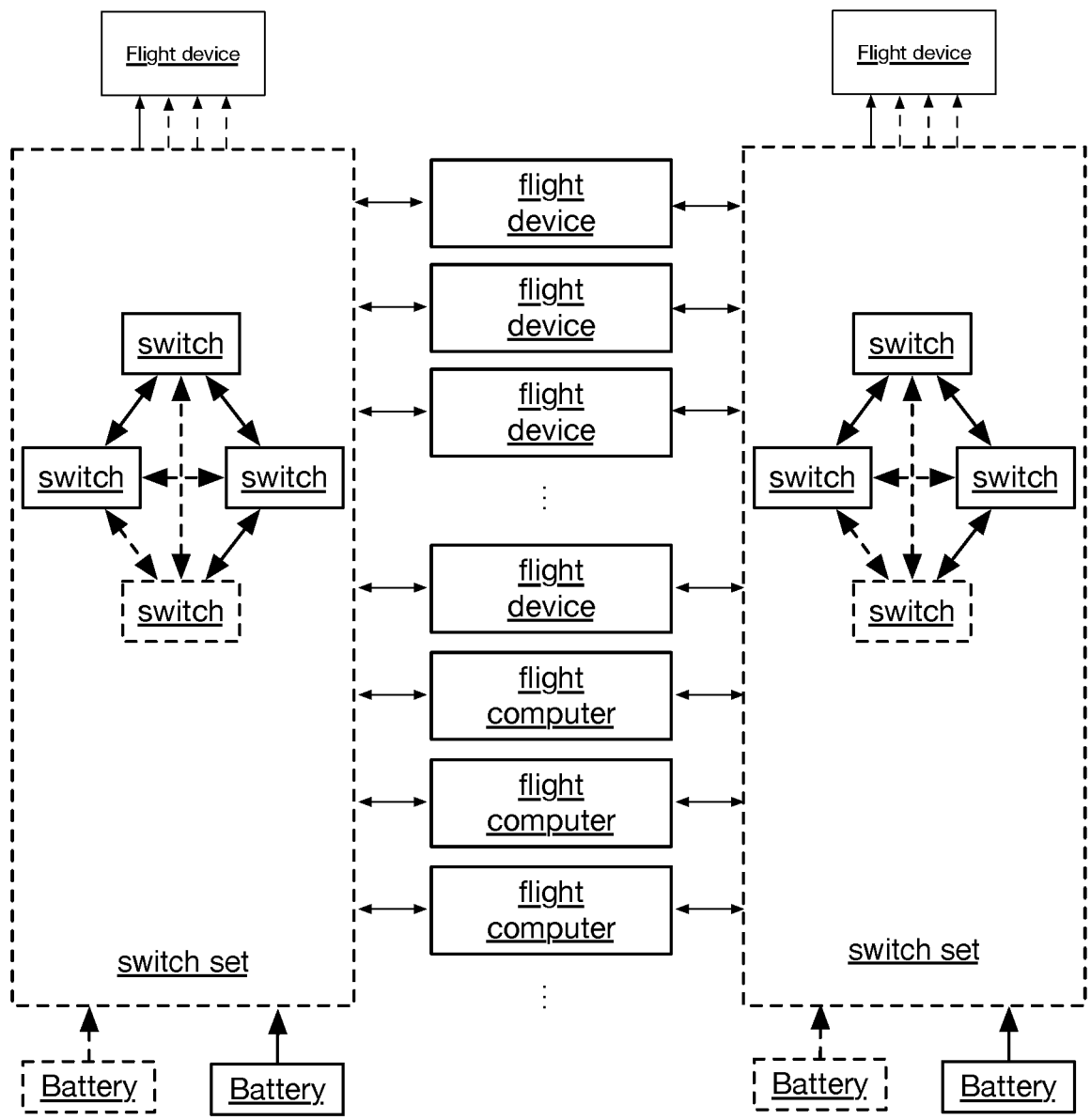
FIG. 5 is a schematic diagram of a specific example of the command and control system.

In a specific example (as shown in FIG. 5) the system includes a first and a second switch set. Each switch set includes 4 switches, with every switch in a switch set connected to the remainder of the switches in the switch set. Each switch set is connected to 2 batteries connected by different power connections. Each switch set is connected to 4 flight computers and a plurality of flight devices.

In a first variant of the specific example, the system includes 4 batteries in—2 connected to the first switch set and 2 connected to the second switch set. In a second variant, the system includes 2 batteries, which are both connected to the first switch set and the second switch set.

In a different specific example (as shown in FIG. 6), the system includes a first and a second switch set. Each switch set includes 3 or more switches, with every switch in a switch set connected to the remainder of the switches in the switch set. Each switch set is connected to a power source, and an optional auxiliary power source. Each of the three flight computers is connected to a different switch within the first switch set and a different switch within the second switch set.

The power source 140 functions to (wholly or in part) power aircraft operations (which may include powering computers, powering switches, powering flight components and/or any other appropriate components) with one or more power sources arranged into one or more power source sets.

The one or more power sources preferably include at least one battery, and more preferably a plurality of batteries arranged in various locations throughout the aircraft, but can additionally or alternatively include any suitable power source (e.g., a generator, an electromechanical energy converter, an alternator coupled to a combustion-driven engine or motor, a photovoltaic power source, a ground-based charging station, etc.). Most preferably, the power source includes four or more batteries arranged into two power source sets, with one power source set powering each switch set, but can additionally or alternatively have any appropriate numerosity and arrangement. Power source arrangements may be: distributed about the aircraft (e.g., relative to the CG, based on impact survivability, spaced apart by a minimum radius, relative to aircraft components/computers/switches), based on spatial constraints (such as cabin dimensions and/or proximity to passengers), and/or distributed in any other appropriate fashion. Preferably, the power source supplies power to switches from redundant sets (e.g., one or more batteries) connected to each switch in switch set, but additionally or alternatively one or more power sources (or set of power sources) may be connected to a set of the switches (e.g., 1, 2, 3, etc.) in each switch set. Preferably, redundant power sources supply power to different switch sets within a switch set, but can additionally or alternatively supply power in any appropriate manner (e.g., supply power in series or parallel or any combination thereof). Each power source (or subunit therein) can be connected to one or more switch sets or switches within a given switch set. In a first variant, a power source set is directly connected to a single switch set. In a second variant, a power source set is directly connected to a single switch. In a third variant, a power source set is connected to each switch within a switch set. Each switch set or switch within a switch set can be connected to one or more power source sets (or subunit therein).

The power sources (e.g., batteries, battery packs, set of battery packs), power source sets, and/or subunits therein (e.g., battery cells within a battery pack) may be partially of fully electrically isolated by a shield or electrical insulation. The power source(s) can be electrically isolated from: flight computers, flight components (e.g., devices, switches, power sources, etc.), the aircraft body or portions thereof (e.g., electrically conductive components, etc.), and/or any other suitable component. The shield or electrical insulation can include: a Faraday cage (e.g., mesh or enclosure made of conductive material grounded to an electrical ground, such as the aircraft frame), rubberized casings, spatial separation, and/or any other suitable material. Additionally or alternately, the system may include secondary enclosures for batteries/cells within a battery (battery pack) with additional insolation employing the same or different insulating techniques from the pack as a whole. Power connections between batteries may additionally or alternately have any other appropriate protections (e.g., breakers, protection circuits, etc.) to avoid failures propagating to other cells/batteries. Cells within a battery (battery pack) may be organized in series or in parallel, or in any combination thereof. Each battery preferably has a battery management system (BMS) which can be controlled via the distribution network, but additionally or alternatively the system may include any appropriate number of BMS's controlling the power sources in any appropriate manner. Batteries are preferably rechargeable batteries, but may additionally or alternately be any other suitable type of battery with any suitable chemistry. Batteries chemistries may be: SLA, RAM, NiZn, NiFe, NiCd, NiH$_2$, NiMH, LSD NiMH, LTO, LCO, LFP, NCA, NMC, or other appropriate battery chemistry.

In a first example, a battery is isolated inside an enclosure which is preferably grounded to the aircraft frame (e.g., frame is composite material with integrated copper mesh acting as a Faraday cage) and/or an electrically conducting pathway. Most preferably, each battery has a dedicated enclosure (e.g., Faraday cage style enclosure, composite with integrated copper mesh, etc.) which is electrically isolated relative to any appropriate devices/flight components. In a second example, batteries are electrically isolated relative to a conducting pathway for the aircraft (e.g., with at least one battery on either side of the conducting pathway, at least one battery on either side of the conducting pathway from a top and/or side view).

In a specific example, a first and second battery are connected to a first PoE switch, and a third and fourth battery are connected to a second PoE switch; however, in related examples, a plurality of batteries can be connected to a plurality of PoE switches with any suitable correspondence (e.g., one-to-one correspondence, one-to-many correspondence, many-to-one correspondence, etc.).

The aircraft may be equipped with lightning protections including a conducting pathway(s) (designed to ground components and/or divert lightning away from critical components), a conducting mesh (e.g., may be integrated into a composite aircraft frame/structure/body, copper mesh, etc.), conducting enclosures (e.g., including electromagnetic-shielding, EMI enclosures, Faraday cages) for various components, and/or any other suitable lightning protections. In variants, the conducting pathway arrangement can be determined based on: flight component arrangement, electrical arc paths throughout the aircraft, aircraft axes (e.g., extend along or parallel the pitch, yaw, and/or roll axes), and/or be otherwise determined.

Figure 4:
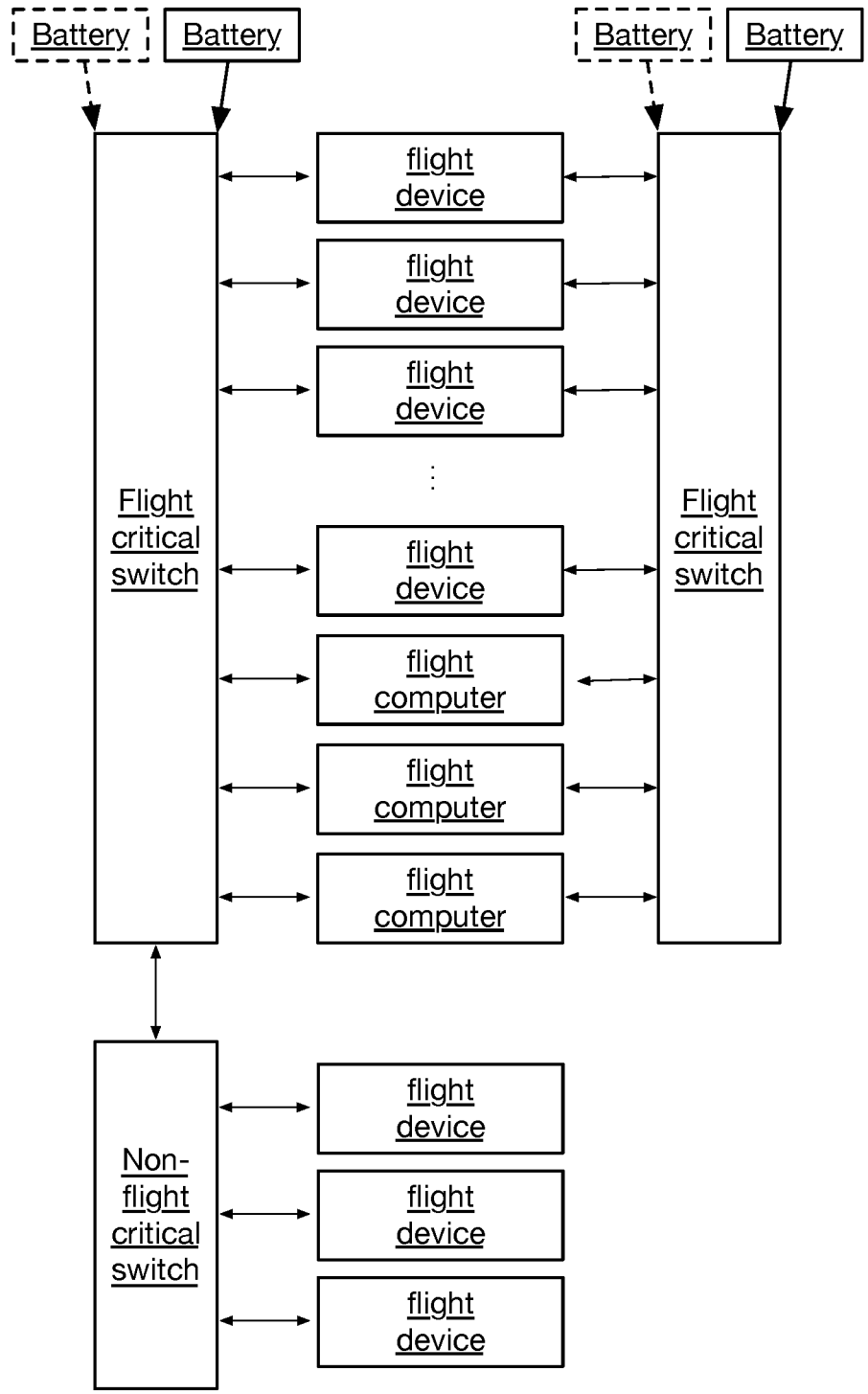
FIG. 4 is a schematic diagram of a specific example of the command and control system.

As shown in FIG. 4, a specific example of the command and control system includes four batteries, a first PoE switch directly connected to two of the four batteries, and a second PoE switch directly connected to two of the four batteries (e.g., the two batteries not directly connected to the first PoE switch).

However, the system can include any other suitable set of components.

4. Method

Figure 7:
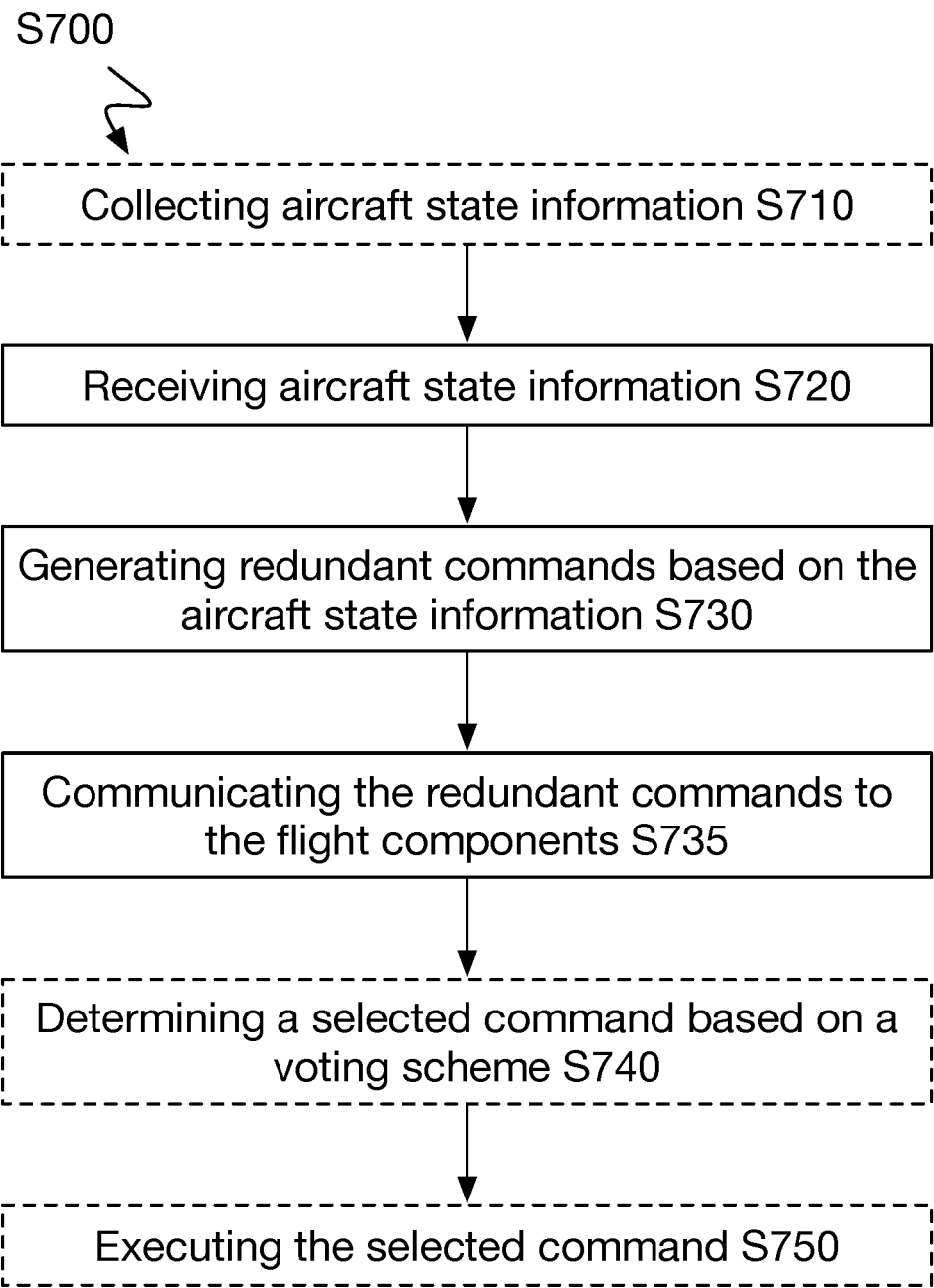
FIG. 7 is a diagram of a variation of the command and control method.

The method S700 (as shown in FIG. 7) functions to provide fault-tolerant command and control of the aircraft. The method includes: receiving aircraft state information S720, generating redundant commands based on the aircraft state information S730, and communicating the redundant commands to the flight components S735. The method S700 may additionally include collecting aircraft state information S710, determining a selected command based on a voting scheme S740, executing the selected command S750, and/or any other suitable steps/sub-steps.

Optional collecting aircraft state information S710 functions to collect aircraft state information from redundant flight components (e.g., sensors) to be used for command/control of the aircraft. Preferably, this data collected in S710 is communicated via the distribution network, but can additionally or alternately be transmitted via wired/wireless communication or otherwise stored/used. Preferably, the same aircraft state information is collected by multiple sources (e.g., multiple instances of the same sensor, multiple types of sensors collecting the same type of data), but alternately can operate in any appropriate manner. S710 preferably occurs before S720, but may happen with any appropriate relationship to any step in the method.

Receiving aircraft state information functions S720 to communicate redundant inputs to the flight computers. This may include aircraft state information collected by flight components as in S710, but can additionally or alternatively include other data from external sources, stored data, and/or other data. Preferably, each flight computer receives aircraft state information independently, but can additionally or alternately communicate and/or cross check data with other flight computers. Aircraft state information preferably includes sensor information, state information, faults, and/or any other appropriate data. Preferably, redundant aircraft state information can be independently received from one or more switch sets, and the source of truth can be determined by the flight computer based on a voting scheme or other approach. S720 preferably occurs before S730, but may happen with any appropriate relationship to any step in the method.

Generating redundant commands based on the aircraft state information S730 functions to perform redundant computing for command/control operations for the aircraft. Preferably, commands are generated by each computer independently (synchronously or asynchronously) based on aircraft state information received by the flight computer but can additionally or alternately occur in any appropriate manner. The commands are preferably generated by different computers using the same methods (e.g., algorithms), but can additionally or alternatively be generated using different methods. Preferably, S730 is performed after S720 and before S735, but can be performed with any appropriate relationship to any step in the method.

Communicating the redundant commands to the flight components S735 functions to send commands to flight components via one or more switch sets. The communication may occur synchronously or asynchronously, with any appropriate data frequency/event/sequence, or in any appropriate manner. Preferably, commands are sent via redundant switch sets and addressed to the same component(s). In a first example, communicated data packets can identify a source flight computer, which may be used for voting schemes to determine a selected command. In a second example, communicated data packets can identify a flight component (or set thereof, such as a redundant set), which may be used for voting schemes to determine a selected command. S735 is preferably performed after S730 and before S740, but may be performed with any appropriate relationship to any step in the method.

Figure 2B:
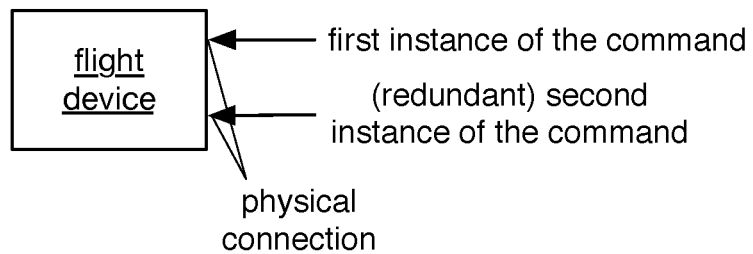
FIG. 2B is a diagram of an example flight component of the command and control system receiving duplicative flight data, according to a variation of the command and control system.

Optional determining a selected command based on a voting scheme S740 functions to ensure that redundant flight computers agree and faulty commands are ignored. S740 may be based wholly or in part on the commands and/or fault indicators. S740 may be performed wholly or in part by a switch, a switch set, and/or the flight component. In a first example (illustrated in FIG. 2A): each switch has 3 or more redundant inputs (one from each of flight computers), selects one based on vote and/or fault indicator; each flight component receives 2 redundant inputs (or one from each switch set), and selects the command based on fault indicator or in any appropriate manner. In a second example (illustrated in FIG. 2B): each switch has 3 or more redundant inputs (one from each of the flight computers) and transfers them to the flight component; the flight component receives 2 (one for each switch set) data streams with 3 or more commands each (commands are redundant across the data streams) and determines selected command based on voting and/or fault indicator. S740 may be performed before, during or after communicating the redundant commands to the flight components, or may be performed with any appropriate relationship to any step in the method.

Executing the selected command S750 functions to perform operations based on the redundant aircraft command/control. Preferably, S750 is performed by flight component (s), but additionally or alternately may be performed wholly or in part by any other appropriate component. S750 is preferably performed after S740, but may be performed with any appropriate relationship to any step in the method.

However, the method can otherwise provide fault-tolerant command and control.

The system and/or method of the preferred embodiment and variations thereof can be embodied and/or implemented at least in part as a machine configured to receive a computer-readable medium storing computer-readable instructions. The instructions are preferably executed by computer-executable components preferably integrated with and/or part of the system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various system components, which can be combined in any suitable permutation or combination and/or omitted in whole or in part from variations of the preferred embodiments.

As a person skilled in the art will recognize from the previous detailed description and from the figures and claims, modifications and changes can be made to the preferred embodiments of the invention without departing from the scope of this invention defined in the following claims.

What is claimed is:

1. A system comprising, for an aircraft:
a plurality of flight devices configured to control aircraft operation;
at least three flight computers configured to command operation of the plurality of flight devices; and
a plurality of power and data switches comprising a first power and data switch set and a second power and data switch set,
wherein the first power and data switch set is communicatively connected directly to each of the at least three flight computers;
wherein the second power and data switch set is communicatively connected directly to each of the at least three flight computers;
wherein the first power and data switch set is directly communicatively connected to each of the plurality of flight devices;
wherein the second power and data switch set is directly communicatively connected to each of the plurality of flight devices; and
wherein the first power and data switch set is communicatively isolated from the second power and data switch set so that the first power and data switch set and the second power and data switch set do not exchange data,
wherein the first power and data switch set comprises at least three power and data switches, and wherein each of the at least three flight computers is communicatively connected by an individual power and data cable to a different power and data switch within the first power and data switch set.

2. The system of claim 1, further comprising individual Ethernet cables connecting:
the first power and data switch set to each of the at least three flight computers and each of the plurality of flight devices, and
the second power and data switch set to each of the at least three flight computers and each of the plurality of flight devices.

3. The system of claim 1, wherein the plurality of flight devices comprises an avionics gateway, wherein the individual Ethernet cables comprise a power over Ethernet connection between the avionics gateway and the first power and data switch set, wherein the power over Ethernet connection between the avionics gateway and the first power and data switch set is configured to operate at a power of at least 20 Watts.

4. The system of claim 1, wherein the first power and data switch set comprises two power and data switches, wherein each power and data switch in the first power and data switch set is communicatively connected directly to a remainder of the power and data switches in the first power and data switch set, wherein the second power and data switch set comprises two power and data switches, wherein each power and data switch in the second power and data switch set is communicatively connected directly to a remainder of the power and data switches in the second power and data switch set.

5. The system of claim 1, further comprising a first set of power sources connected by a power connection to the first power and data switch set and a second set of power sources connected by a different power connection to the second power and data switch set.

6. The system of claim 1, further comprising a first set of power sources and a second set of power sources,
wherein the first set of power sources comprises a first battery and a second battery, wherein the first battery and the second battery are connected to the first power and data switch set via a first power cable and a second power cable, respectively,
wherein the second set of power sources comprises a third battery and a fourth battery, wherein the second battery and the third battery are connected to the second power and data switch set via a third power cable and a fourth power cable, respectively, and
wherein the first set of power sources is electrically isolated from the second set of power sources.

7. The system of claim 1, wherein each of the at least three flight computers is configured to receive aircraft state information and generate commands based on the aircraft state information.

8. The system of claim 7, wherein:
the first power and data switch set is configured to receive the commands generated by each of the flight computers;
the second power and data switch set is configured to receive the commands generated by each of the flight computers;
the first power and data switch set and the second power and data switch set are configured to send a first selected command and a second selected command to a flight device, respectively;
the first selected command is selected from commands received by the first power and data switch set based on a voting scheme, wherein the voting scheme checks for agreement between the commands received by the first power and data switch set; and
the second selected command is selected from commands received by the second power and data switch set based on a second voting scheme, wherein the second voting scheme checks for agreement between the commands received by the second power and data switch set.

9. The system of claim 7, wherein the flight devices are configured to receive the commands generated by each of the flight computers, wherein the flight devices are configured to selectively execute the commands based on a voting scheme and fault indicators associated with unreliable data.

10. The system of claim 7, wherein the aircraft state information comprises sensor information collected by a first flight device and a second flight device, wherein the first flight device and the second flight device collect redundant sensor information, wherein the aircraft state information further comprises fault indicators associated with unreliable data.

11. A system comprising, for an aircraft:
a plurality of flight devices configured to control aircraft operation;
at least three flight computers configured to control operation of the plurality of flight devices; and
a plurality of power and data switches comprising a first power and data switch set and a second power and data switch set,
wherein the first power and data switch set is communicatively connected directly to each of the at least three flight computers;
wherein the second power and data switch set is communicatively connected directly to each of the at least three flight computers;

wherein the first power and data switch set is communicatively connected directly to each of the plurality of flight devices;
wherein the second power and data switch set is communicatively connected directly to each of the plurality of flight devices; and
wherein the first power and data switch set and a first flight computer of the at least three flight computers are electrically isolated from the second power and data switch set and a second flight computer of the at least three flight computers.

12. The system of claim 11, wherein the at least three flight computers are contained inside grounded electromagnetic-shielding enclosures, and wherein each of the plurality of power and data switches is contained inside different grounded EMI enclosures.

13. The system of claim 11, wherein the first flight computer is physically separated from the second flight computer by at least a predetermined distance, wherein the predetermined distance is based on impact survivability.

14. The system of claim 11, further comprising a first set of power sources connected by a power connection to the first power and data switch set and a second set of power sources connected by a different power connection to the second power and data switch set.

15. The system of claim 14, further comprising power over Ethernet cables connecting: the plurality of power and data switches, the at least three flight computers, and the plurality of flight devices, wherein the at least three flight computers are communicatively isolated from each other.

16. The system of claim 15,
wherein the first set of power sources comprises a first battery and a second battery, wherein the first battery is contained inside a grounded EMI enclosure which does not contain the second battery,
wherein the second set of power sources comprises a third battery and a fourth battery, wherein the third battery is contained inside a different grounded EMI enclosure which does not contain the fourth battery,
wherein the first set of power sources is electrically isolated from the second set of power sources.

17. The system of claim 11, wherein the first power and data switch set is communicatively isolated from the second power and data switch set, wherein the first power and data switch set comprises two power and data switches, wherein each power and data switch in the first power and data switch set is communicatively connected to a remainder of the power and data switches in the first power and data switch set, wherein the second power and data switch set comprises two power and data switches, wherein each power and data switch in the second power and data switch set is communicatively connected to a remainder of the power and data switches in the second power and data switch set.

18. The system of claim 17, wherein the first power and data switch set comprises three or more power and data switches, wherein the second power and data switch set comprises three or more power and data switches, wherein each of the at least three flight computers is communicatively connected by an individual cable to a different power and data switch within the first power and data switch set.

19. The system of claim 11, further comprising the aircraft.

20. A system comprising, for an aircraft:
a plurality of flight devices configured to control aircraft operation, comprising a first flight device;
at least three flight computers configured to command operation of the plurality of flight devices, comprising a first, second, and third flight computer; and
a plurality of power and data switch sets comprising a first power and data switch set and a second power and data switch set, wherein the first power and data switch set is communicatively isolated from the second power and data switch set so that the first power and data switch set and the second power and data switch set do not exchange data;
a first cable directly connecting the first power and data switch set to first flight device;
a second cable directly connecting the second power and data switch set to first flight device;
a third cable directly connecting the first power and data switch set to first flight computer;
a fourth cable directly connecting the second power and data switch set to first flight computer;
a fifth cable directly connecting the first power and data switch set to second flight computer;
a sixth cable directly connecting the second power and data switch set to second flight computer;
a seventh cable directly connecting the first power and data switch set to third flight computer; and
an eighth cable directly connecting the second power and data switch set to third flight computer,
wherein the first power and data switch set comprises at least three power and data switches, and wherein each of the at least three flight computers is communicatively connected by an individual power and data cable to a different power and data switch within the first power and data switch set.

21. The system of claim 20, wherein data connections to the first flight device consist of the first and second cables.

* * * * *